US012802325B2

(12) United States Patent
Soulvie et al.

(10) Patent No.: US 12,802,325 B2
(45) Date of Patent: Nov. 17, 2026

(54) SYSTEMS AND METHODS FOR COMPUTER ANIMATION USING AN ORDER OF OPERATIONS DEFORMATION ENGINE

(71) Applicant: O3 STORY TECHNOLOGIES, INC., Corona, CA (US)

(72) Inventors: Eric A. Soulvie, Tacoma, WA (US); Richard R. Hurrey, El Sobrant, CA (US); R. Jason Bickerstaff, Orinda, CA (US); Clifford S. Champion, San Jose, CA (US); Peter E. McGowan, Corona, CA (US); Robert Ernest Schnurstein, Victorville, CA (US)

(73) Assignee: O3 STORY TECHNOLOGIES, INC., Corona, CA (US)

( * ) Notice: Subject to any disclaimer, the term of this patent is extended or adjusted under 35 U.S.C. 154(b) by 0 days.

(21) Appl. No.: 19/251,534

(22) Filed: Jun. 26, 2025

(65) Prior Publication Data

US 2025/0322579 A1 Oct. 16, 2025

Related U.S. Application Data

(63) Continuation of application No. 18/623,830, filed on Apr. 1, 2024, now Pat. No. 12,367,631, which is a (Continued)

(51) Int. Cl.
*G06T 13/40* (2011.01)
*G06T 13/20* (2011.01)
(Continued)

(52) U.S. Cl.
CPC .............. *G06T 13/40* (2013.01); *G06T 13/20* (2013.01); *G06T 13/60* (2013.01); *G06T 17/20* (2013.01);
(Continued)

(58) Field of Classification Search
CPC ......... G06T 13/20; G06T 13/40; G06T 13/60; G06T 17/20; G06T 17/205; G06T 17/30; G06T 19/20; G06T 2213/12
See application file for complete search history.

(56) References Cited

U.S. PATENT DOCUMENTS 8,786,611 B1 * 7/2014 Comet .................... G06T 19/20 345/473
2004/0090438 A1 * 5/2004 Alliez ..................... G06T 17/20 345/423
(Continued)

FOREIGN PATENT DOCUMENTS

WO 2019/023397 A1 1/2019

OTHER PUBLICATIONS

Canadian Patent Office, "Examiner's Requisition," for Canadian Application No. 3,184,824, Sep. 2, 2026.

*Primary Examiner* — King Y Poon
*Assistant Examiner* — Vincent Peren
(74) *Attorney, Agent, or Firm* — Dentons Durham Jones Pinegar; Richard Christiansen; Sarah W. Matthews

(57) ABSTRACT

A method for computer animation includes receiving an input file that includes an asset geometry, where the asset geometry defines an asset mesh structure, where the asset geometry may exclude an internal support frame, and where logic for custom deformation steps may be included, altogether in a fashion portable and made to produce consistent results across multiple different software and/or hardware platform environments and/or across real-time and/or offline scenarios. The method also includes applying at least one deformer to the asset mesh structure, where the at least one deformer includes a plurality of user-selectable deformer channels, and where each deformer channel is associated with at least a portion of the asset mesh structure and is
(Continued)

configured to adjust a visual appearance of the associated portion of the asset mesh structure.

20 Claims, 29 Drawing Sheets

Related U.S. Application Data continuation of application No. 18/296,852, filed on Apr. 6, 2023, now Pat. No. 11,948,240, which is a continuation of application No. 17/384,146, filed on Jul. 23, 2021, now Pat. No. 11,631,209.

(60) Provisional application No. 62/706,006, filed on Jul. 24, 2020.

(51) Int. Cl.

| | |
|---|---|
| ***G06T 13/60*** | (2011.01) |
| ***G06T 17/20*** | (2006.01) |
| ***G06T 17/30*** | (2006.01) |
| ***G06T 19/20*** | (2011.01) |

(52) U.S. Cl.

CPC ............ *G06T 17/205* (2013.01); *G06T 17/30* (2013.01); *G06T 19/20* (2013.01); *G06T 2213/12* (2013.01)

(56) References Cited

U.S. PATENT DOCUMENTS

| | | | | | |
|---|---|---|---|---|---|
| 2004/0179013 | A1* | 9/2004 | Menache | G06T 13/40 | 345/473 |
| 2007/0035541 | A1* | 2/2007 | Isner | G06T 17/20 | 345/420 |
| 2015/0269764 | A1* | 9/2015 | McGill | G09B 5/02 | 345/474 |

* cited by examiner

500

600

600

600

700

700

700

800

SYSTEMS AND METHODS FOR COMPUTER ANIMATION USING AN ORDER OF OPERATIONS DEFORMATION ENGINE

CROSS-REFERENCE TO RELATED APPLICATION

This application is a continuation of and claims priority to U.S. patent application Ser. No. 18/623,830, filed Apr. 1, 2024, which is a continuation of U.S. patent application Ser. No. 18/296,852, filed Apr. 6, 2023, which is a continuation of U.S. patent application Ser. No. 17/384,146, now U.S. Pat. No. 11,631,209, filed Jul. 23, 2021, which claims priority to and the benefit of U.S. Provisional Patent Application No. 62/706,006, filed Jul. 24, 2020, all of which are hereby incorporated by reference in their entireties.

BACKGROUND

The field of the disclosure relates generally to three-dimensional ("3D") animation, and more particularly, to 3D animation using order of operations-based deformations to create feature-film quality assets deployable to a variety of existing platforms.

3D animation is used in a wide variety of industries, such as video game and film production. A variety of animation tools and computer functionality are used to create and animate objects, such as characters, for use in these industries. For example, in the video game industry, game systems, also sometimes referred to as "game engines" or "game engine systems," are used to develop and animate objects and characters that are then displayed during game play on a user interface.

Many conventional game systems, such as those used in the development and production of modem video games, employ skeletal animation techniques, or in the common parlance of video game developers, "skin and bones" techniques. These skeletal animation techniques are arranged to simulate the motion and deformation of articulated objects, such as animated humanoid characters, using a set of interconnected members (or "bones") and joints, which may loosely, m some cases, resemble a human skeleton (at least in the case of humanoid characters). A surface mesh (or "skin") may be bound to or associated with the skeletal structure to represent an exterior surface of the articulated object.

In many conventional skin and bones implementations, the motion and surface deformation of skin and bones objects are governed by complex physics-based (and other) algorithms, which may be implemented in the background by software referred to as a "game engine" or a "digital content creation (DCC) tool," and which may execute on the objects to simulate motion and other physical deformations (e.g., running, jumping, facial expressions, motion of clothing, etc.). Several examples of popular game engines (or DCC software products) include, but are not limited to, MODO, UNREAL ENGINE, UNITY, AND MAYA.

To facilitate intuitive development, these complex algorithms are not typically exposed to the game developers and graphic artists responsible for character creation. Rather, a simplified graphical user interface is presented by the game engine system, and objects and characters are created in the system interface using graphical and other animation tools. As a result, on the front end, the development process reduces to something akin to digital sculpture, where the skin and bones elements of a particular object are manipulated and crafted to function as desired.

However, although the physics and other algorithms responsible for governing the motion and deformation of game engine objects are typically executed as background processes and do not need to be directly managed by game developers, a variety of problems arise as a result of the skin and bones techniques utilized by these systems. For example, conventional skin and bones game engine systems are, by design, arranged to function in a way that associates each bone in the articulated character architecture with some aspect of the skin. Stated another way, to control a deformation or motion parameter occurring on the character's skin, it is often necessary (even in the simplified user interface) to adjust the bone associated therewith. As those of skill in the art will appreciate, to achieve complex deformations, many bones must be adjusted, and even in the most labor intensive and best-developed games, this process results in character stiffness and, more generally, character representations that are simply not very lifelike.

Moreover, realistic character development is inhibited by the fact that the motion and/or deformation of skin near the intersection of multiple bones may be influenced by each bone. To accommodate motion at these intersections, it is commonly necessary to form a matrix or hierarchy of bone relationships, where each bone in an interconnected matrix of bones may affect the motion of every other bone. As a result, the motion and deformation properties associated with any given bone in a character or object skeleton are likely to affect the motion and deformation of other, linked, bones. In algorithmic terms, this can result in a cascading series of deformations, each of which must be considered by a game developer when the developer alters the object appearance near a given bone. In complex character development, this frequently results in extremely time consuming, labor-intensive, design processes.

In addition to these drawbacks, many conventional skin and bones game engme systems must maintain a substantial library of geometric and other deformation data to facilitate the desired motion and animation properties of each of a wide variety of individually designed game characters. At run-time (e.g., during game-play), the computer memory requirements can, it will be appreciated, be quite large. Likewise, the computational requirements for displaying the motion and actions performed by game characters can be extreme, requiring state of the art graphics processing units ("GPUs") and in some cases, central processing units ("CPUs").

Further, tools for 3D design and animation are increasingly merging across industries, such as film, television, and 3D printing. Producing 3D printed static models as well as actuated dynamic models, such as physical models or animatronics, is of relevance to some theme park and/or other related entertainment and may benefit from tools for designing and deforming 3D animated characters. In addition, tools for 3D animated characters are increasingly driven in real-time by actors or artists at their desks, or by actors or performers in a sound stage or virtual production set. Such tools typically accept inputs from motion tracking, facial tracking, or hand-operated (e.g. so-called waldo) systems and process this data to update 3D animated characters in real-time. Moreover, story-driven franchises increasingly desire to publish the same characters and stories across different media such as across both games and feature films. Traditionally this is an expensive process because character assets are not easily reusable between the feature film teams and game teams, thus character assets are created twice for each platform. Moreover, increasingly digital experiences are desired to be deployed across very differently capable hardware systems, from portable low energy devices to high performance gaming consoles, desktops, and cloud rendering systems, again often requiring multiple versions of assets to developed at additional costs to time and money.

Accordingly, systems for creating more life-like objects and characters are desirable. More particularly, systems that are not limited by the industry-traditional skin and bones techniques for character development are desirable, for example systems which can replicate the deforming effects of muscle and fat, or for example systems which allow for general non-linear spatial deformations. In addition, systems that ease and simplify the memory and computational requirements inherent and computer graphics and other 3D animation techniques are desirable. Systems capable of facilitating and interacting with 3D design and animation tools, such as 3D printing and animatronics techniques as well as tools capable of accepting real-time motion capture data from artists, are also desirable. Moreover, as described, the systems described herein facilitate operation of a given asset across multiple media and devices, including for example, mobile devices, game consoles, cloud-based rendering, and TV/Film rendering media and devices. These, and other advantages, are described herein with reference to the present disclosure.

BRIEF DESCRIPTION

In one aspect, a method for computer animation is described. The method includes receiving, by a processor executing a multi-platform deformation engine system in association with a third-party game engine system, an input file that includes an asset geometry, where the asset geometry defines an asset mesh structure, and where the asset geometry may exclude an internal support frame, such as an internal skeleton, as described herein. The method also includes applying, by the processor, at least one deformer to the asset mesh structure, where the at least one deformer includes a plurality of user-selectable deformer channels, and where each deformer channel is associated with at least a portion of the asset mesh structure and configured to adjust a visual appearance of the associated portion of the asset mesh structure. The method also includes receiving, by the processor and based on a user input, a customizable order of operations for execution of at least a subset of the plurality of deformer channels, the order of operations specifying an order in which each deformer channel of the subset is to be executed in real-time during animation of the asset geometry. In addition, the method includes generating, by the processor, an output file that includes the asset geometry, the at least one deformer instance, and the order of operations.

In another aspect, a tangible, non-transitory, computer-readable storage medium is described. The storage medium has instructions stored thereon, which when executed by a processor executing a multi-platform deformation engine system in association with a game engine system, are configured to cause the processor to at least: receive an input file that includes an asset geometry, where the asset geometry defines an asset mesh structure, the asset geometry, in at least some embodiments, excluding an internal framework, such as an internal skeletal framework traditionally associated with a skin and bones system. The instructions also cause the processor to associate at least one deformer instance with the asset mesh structure, where the at least one deformer instance includes a plurality of user-selectable deformer channels, and where each deformer channel is associated with at least a portion of the asset mesh structure and configured to adjust a visual appearance of the associated portion of the asset mesh structure. The instructions also cause the processor to receive, based on a user input, a customizable order of operations for evaluation of at least a subset of the plurality of deformer channels, where the order of operations specifies an order in which each deformer channel of the subset is to be evaluated in real-time during animation of the asset geometry, and generate an output file that includes the asset geometry, the at least one deformer instance, and the order of operations.

In yet another aspect, a system for computer animation Is described. The system includes a memory device, and a processor configured to execute instructions stored on the memory device, which when executed, cause the processor to at least receive an input file that includes an asset geometry, where the asset geometry defines an asset mesh structure, the asset geometry, in at least some embodiments, excluding an internal framework. The instructions also cause the processor to associate at least one deformer instance with the asset mesh structure, where the at least one deformer instance includes a plurality of user-selectable deformer channels, and where each deformer channel is associated with at least a portion of the asset mesh structure and configured to adjust a visual appearance of the associated portion of the asset mesh structure. The instructions also cause the processor to receive, based on a user input, a customizable order of operations for evaluation of at least a subset of the plurality of deformer channels, where the order of operations specifies an order in which each deformer channel of the subset is to be evaluated in real-time during animation of the asset geometry, and generate an output file that includes the asset geometry, the at least one deformer instance, and the order of operations.

DETAILED DESCRIPTION

Figure 1:
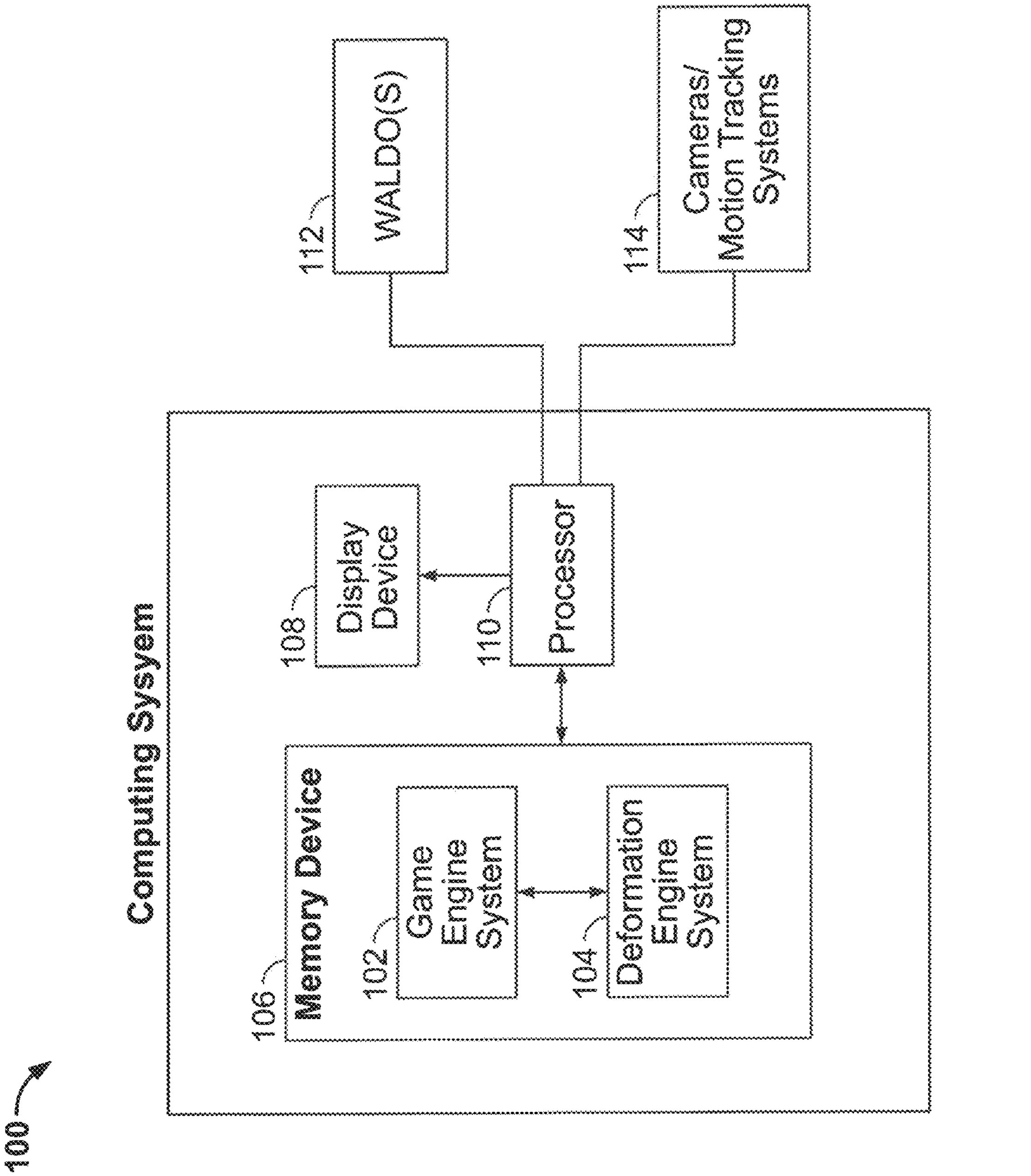
FIG. 1 is a block diagram of an example embodiment of a computing system that includes a game engine system and an order of operations ("000") deformation engine system, as described herein.

Embodiments of the systems and methods described herein include a deformation engine system that may be used by game developers, artists, and other users to create unique, life-like, high-speed, robust asset deformations in real-time. In contrast to a traditional skin and bones game engine system, the deformation engine system described herein may receive (or facilitate creation of) an asset, such as a character or another object, having an exterior mesh but not necessarily an internal framework, such as an articulating internal framework of "bones" or "joints."

Rather, the deformation engine system may operate on the mesh, such as by the addition of one or more deformers to the mesh. As described herein, each deformer may include a plurality of deformer channels, each of which may, in turn, be responsible for controlling a deformation of a unique aspect of the asset geometry. In at least some embodiments, the deformation engine system facilitates independent adjustment of each deformer and/or deformer channel, such as using a channel weight, which may be easily controlled by the user to achieve a desired combination of asset deformations.

In many embodiments, and in contrast to a traditional skin and bones systems, the individual deformations and/or deformation channels are not transforms of one another. Stated another way, adjusting one deformation channel does not require a user to go back to a related deformation channel to make compensating adjustments. Rather, each deformation applied to an asset may change an appearance of the asset independently of one or more other deformations also applied to the asset.

Moreover, an order of operations or order of evaluation may be specified by a user during development for each of the deformations and/or deformation channels selected for and applied to an asset. By adjusting the order of operations, the combined or overall deformation applied to an asset may be almost infinitely varied to achieve life-like, and in some cases, film-quality, results. For example, performing a rotate deformation prior to performing a slide deformation may achieve a different result than performing the same slide deformation prior to performing the rotate deformation.

In addition to these features, in many embodiments, deformers may be associated with weight maps to control or blend a deformation over a portion of an asset mesh, such as over a portion of the asset mesh that may be affected by a given deformation in real-life. To illustrate, a character deformation that opens a character's mouth wide may be expected, in real-life, to impact the deformation applied to the character's cheeks. A weight map may thus be applied that blends a deformation in the domain, or region, of the mouth, cheeks, and/or other portions of the face, to create more life-like, distributed, deformations that are blended over portions of an asset mesh.

Weight maps may also, in many embodiments, be layered and/or animated to achieve even more complex deformations, such as deformations that, when evaluated by the deformation engine system, produce deformation graphics that are more than and/or different from their individual deformation components. These and a variety of other advantages and deformation techniques are facilitated and enabled by the deformation engine system, as described herein.

Embodiments of the deformation engine system described herein thus provide a variety of technical benefits and specific technical improvements, such as, for example, but not limited to: (a) providing a deformation engine system that facilitates asset development without the use of traditional skin and bones asset geometries, such as an internal asset framework utilizing a matrix of articulating bones or joints to achieve surface deformations; (b) providing a deformation engine system that facilitates receiving an order of operations for each of a plurality of deformer channels (and/or deformers), whereby a user may specify the order in which each deformer channel will be evaluated during simulation and/or game execution; (c) providing a deformation engine system that facilitates channel weighting and weight mapping in association with any of a plurality of deformer channels; (d) providing a deformation engine system that facilitates layering one or more weight maps to achieve life-like, beautiful, animation results; (e) providing a deformation engine that facilitates animating weight maps to simplify complex movement, (f) providing a deformation engine that facilitates custom (user-defined) deformer operators, in a fashion easily and consistently transferable across engines, DCCs, and across different hardware devices, (g) providing a deformation engine system that facilitates real-time deformation of assets, such as during simulation and/or gameplay, based upon distances from a player and/or other participants, such as for example, to lessen computational time spent on the deformation assets that are at least a threshold distance from a player asset or player character; (h) pre-optimization of image rendering operations prior to execution of the game by a processor, such that a portion of an asset that appears off-screen during a frame of gameplay may not be rendered for the given frame to improve processing speed and reduce memory allocation requirements (e.g., because the off-screen portions of the asset do not need to be rendered or deformed); (i) selectively caching portions of assets to improve processing speed and/or memory allocation requirements, such as by recycling of deformation information from frame to subsequent frame for assets that have not changed or moved (or that have changed less than a threshold amount) and/or assets or portions of an asset that do not otherwise require any visual refresh; (j) detection of redundant or unused deformation channels and/or deformation instances, minimally used or minimal-effect deformation channels, unnecessary weight maps, and/or other paring processes to reduce output file size prior to simulation and/or gameplay; and (k) storage of poses for rapid and easy application to a new asset geometry, without having to recreate all of the rigging for a new asset from scratch, whereby, for example, asset rigging time may be greatly reduced for a given asset, such as from several days to several hours.

As used herein, and as described in additional detail below, terms such as “model,” “character,” “object,” “asset,” and “asset geometry” may refer to any geometric construct created, as described herein, as a representation of an object, such as any real-world and/or imaginary object that may be portrayed in an animation, such as a video game and/or feature film animation.

As used herein, and as described in additional detail below, terms such as “mesh,” “mesh structure,” and “topology” may refer to a geometric lattice or framework that defines an exterior surface of a model or asset. The mesh structure may include a plurality of “spans,” each of which may extend to define least a portion of the surface of the model or asset.

As used herein, and as described in additional detail below, terms such as “deformer channel,” “deformation channel,” “channel,” and the like may refer to an attribute or parameter, such as any geometric parameter, any animation parameter, any motion parameter, and the like, that may be associated with a model or asset. To illustrate, and as described herein, a deformer channel may define a head motion parameter in association with a head and/or facial portion of an asset, such as, but not limited to, left and right motion, forward and back motion, jaw motion, cheek motion, and it will be appreciated, many other such attributes.

As used herein, and as described in additional detail below, terms such as “deformer channel weight,” “deformer channel weighting,” “channel weighting,” “weighting,” “deformer weighting,” and the like, may refer to one or more numeric transform or deformation values associated with a particular deformer channel. In at least some embodiments, a weighting may be used to control and/or modify an appearance of a respective channel, such as for example, to control motion, shape, and/or other aspects of the channel. As described herein, channel weightings may be adjusted to apply visual and artistic changes to an asset’s geometry, such as to tilt an asset head back and forth and/or left and right, to move an asset jaw, to push or suck-in an asset cheek, and the like. In addition, as described herein, deformer channels may associated with one or more “weight maps,” which may, as used herein, refer to a degree to which a particular channel impacts areas of a mesh structure surrounding the region of the mesh structure that the channel controls. For example, a weight map for a “jaw motion” channel, may specify a degree to which motion of the jaw (of an asset) spreads to and affects other areas of the asset’s geometry, such as the cheeks and forehead. The area or region affected by a weight map may be referred to as a “region,” a “domain,” an “affected domain,” and the like.

As used herein, and as described in additional detail below, terms such as “deformer” and/or “deformer instance” may refer to a specific combination of, mathematical or numerical operators, a grouping or set of deformer channels, possibly including respective weightings, which altogether may be calibrated or adjusted in real-time during artistic development of an asset. Further, as described herein, in some embodiments, a single deformer may be applied to a given asset to govern many aspects of the geometry and motion of the asset (including in some cases, all aspects thereof), such that a single deformer may substantially simplify asset creation. As described herein, the process of applying one or more deformers to a mesh structure may, at least in part, describe a processor referred to as “rigging,” where an asset or mesh structure associated therewith may be “rigged” by associating the asset or mesh structure (e.g., in a memory device) with one or more deformers, deformer channels, weightings, weight maps, and the like.

Moreover, in at least some embodiments, a plurality of deformation channels may be collectively applied to an asset in one or more “layers”. As a result, as used herein, and as described in additional detail below, terms such as “layer” and “layers” may refer to one or more deformation channels applied to an asset. In some cases, channels may be described as being “attached” to an asset mesh. As used herein, “attachment” of a deformation layer to a mesh may refer to inclusion of the deformation channel, including weighting and other channel parameters, in a file and/or file format that associates the channel parameters with the mesh. Further, in some embodiments, one or deformers (or deformation instances) may also be collectively applied to an asset in one or more layers, which may, as described herein, be evaluated independently of one another at run-time as well as in a predefined (user-set) order of operations.

Accordingly, as used herein, and as described in detail below, the deformation engine system described herein may be referred to as an “order of operations” or “000” deformation engine. The phrase “order of operations” may thus, in at least some embodiments, be used to refer to the capability of the deformation engine to receive as well as evaluate an order of operations for a plurality of deformation channels and/or deformation instances, such that no deformation channel, for example, is evaluated as a graphical transform of any other deformation channel. Rather, in at least some embodiments, each deformation channel is evaluated independently of every other deformation channel. In some embodiments, as described herein, an output of one deformation channel or deformation layer to be used as an input to one or more other deformation channels or deformation layers. In at least some embodiments, the independence and/or dependence of deformation channels and/or layers on other deformation channels and/or layers may be a capability that is provided to and/or selectable by an artist or developer, such that the developer or artist may select channel and/or layer dependencies, as desired. As described herein, this order of operations functionality facilitates a complete technical solution that focuses on the development of feature film quality characters and deploying them to any platform, such as any third-party game engine product, including, but not limited to, third-party game engines such as UNREAL ENGINE, MODO, UNITY, MAYA, and the like.

As used herein, and as described in additional detail below, terms such as “deformation stack” or “stack” may refer to an order of deformers and/or deformation channels provided in association with an order of operations deformation engine. For example, a first deformer channel may appear at the top of a deformation stack, a second deformer channel may appear next in the stack, a third deformer channel may appear after the second deformer, and so on. Such a stack may also more generally be a directed acyclic graph ("DAG"), with inputs of one deformer capturing outputs of other deformer(s). In at least some embodiments, deformation channels may be evaluated by the deformation engine system according to the order specified by the stack, such as from top to bottom or bottom to top. In addition, in at least some embodiments, as described herein, the deformation stack may specify an order in which an output of one or more channels or layers feeds into or is provided as an input to one or more other channels or layers, such as for example, to form a dependency tree. As described herein, in some embodiments, the dependency of channels and/or layers may be selectable by a developer, such that in some cases, channels and/or layers include dependencies, and in other cases, no dependencies may exist.

As used herein, and as described in additional detail below, terms such as "rig" may refer to a collection of deformers and/or deformer channels, layered as desired by a game developer or artist and controlled by order of operations settings as established by the artist during asset development. To illustrate, a rig may include a plurality of deformer channels calibrated to create a "happy" asset expression. The rig may be variously applied to any of a plurality of assets or asset meshes, such as a male asset mesh, a female asset mesh, a non-human asset mesh, and the like to impart a "happy" expression to the mesh. Likewise, the channels of this same rig may be calibrated to produce a "sad" asset expression. That is, the rig, once crafted for a mesh or class of topologically-equivalent meshes, is able to then easily produce a variety of expressions for that mesh, e.g. the rig in some sense captures the personality (range of expression) for the mesh.

As used herein, and as described in additional detail below, terms such as "rigged asset" may refer to an asset that includes one or more parameters added by a deformation engine system, such as, but not limited to, deformers, deformer channels, order of operations information, layers and weightings, weight maps, and other parameters, as described herein. Conversely, as used herein, terms such as "naked asset" may refer to assets that excludes parameters added by the deformation engine system.

As used herein, and as described in additional detail below, terms such as "pose" may refer to a collection of deformer channels and channel weightings or channel values that are predefined (e.g., for use by game developers and artists and/or by artists themselves) for subsequent reuse or recycling. To illustrate, example poses include, but are not limited to, "happy," "snarl," etc., where a "happy" pose may include preset channel values to create a happy asset expression (e.g., a happy face), a "snarl" pose may include preset channel to create a snarling or unhappy asset expression, and the like. As a result, poses may embody preset or predefined "rigs," which can be quickly recycled to impart various expressions and/or other geometries to blank or otherwise blank assets.

Accordingly, as described herein, assets and/or meshes may be "blank" as well as "attached." As used herein, a "blank" asset or mesh may not be associated with, or include, any rigs, poses, deformers, channels, etc. Likewise, an attached mesh may be associated with, or include, one or more rigs, poses, deformers, channels, etc.

FIG. 1 is a block diagram of an example embodiment of a computing system 100 that includes a game engine system 102 and an order of operations ("000") deformation engine system 104. In the example embodiment, system 100 includes a memory device 106, a display device 108, and at least one processor 110. As shown the deformation engine system 104 may be stored in the memory device 106 and executed by the processor 110. Likewise, the game engine system 102 may be stored in the memory device 106 and executed by the processor 110.

In at least some embodiments, deformation engine system 104 may be configured to run alongside and/or otherwise in conjunction with game engine system 102, where for example, as described herein, game engine system 102 may include any of a variety of third-party skin and bones game engine systems or "digital content creation (DCC)" tools, such as, but not limited to, MODO, MAYA, UNITY, UNREAL, and the like. Likewise, in the example embodiment, deformation engine system 104 is the OZONE deformation engine system. As described herein, deformation engine system 104, including the OZONE deformation engine system, may in at least some embodiments be an order of operations deformation engine system capable of integration and interoperation with a variety of game engine systems 102, such as any of the traditional game engine systems 102 described herein.

Accordingly, in some embodiments, deformation engine system 104 may execute as a plug-in or otherwise as a software addition or extension to an existing third-party game engine system. Moreover, in some embodiments, game engine system 102 may be a proprietary game engine system that includes a built-in version of deformation engine system 104.

As a result, in some embodiments, deformation engine system 104 may be implemented in conjunction with any suitable pre-existing game engine system 102 to add to the existing system the order of operations and other functionality described herein. In these embodiments, deformation engine system 104 may function as a replacement for at least some of the traditional skin and bones deformation programming operations offered by these traditional third-party systems. Where deformation engine system 104 is included in a proprietary game engine system 102, such as an OZONE game engine system, no skin and bones functionality may be included whatsoever.

In addition to these features, system 100 may be configured to receive input from a variety of physical controllers 112 or input rigs, sometimes known as "waldos", and/or one or more other commodity devices, such as, but not limited to game controllers. In these embodiments, waldos may be provided to receive motion control input from an artist or developer, which may be translated by deformation engine system 104 into corresponding deformation channel and other character animation properties, as described herein.

System may, in addition, be configured to receive user input from a variety of cameras and/or other motion capture and/or motion tracking devices 114, such as, but not limited to, motion capture sensors that may be worn by a human actor. Data output by motion tracking devices 114 may also be translated by deformation engine system 104 into corresponding deformation channel and other character animation properties.

Figure 2:
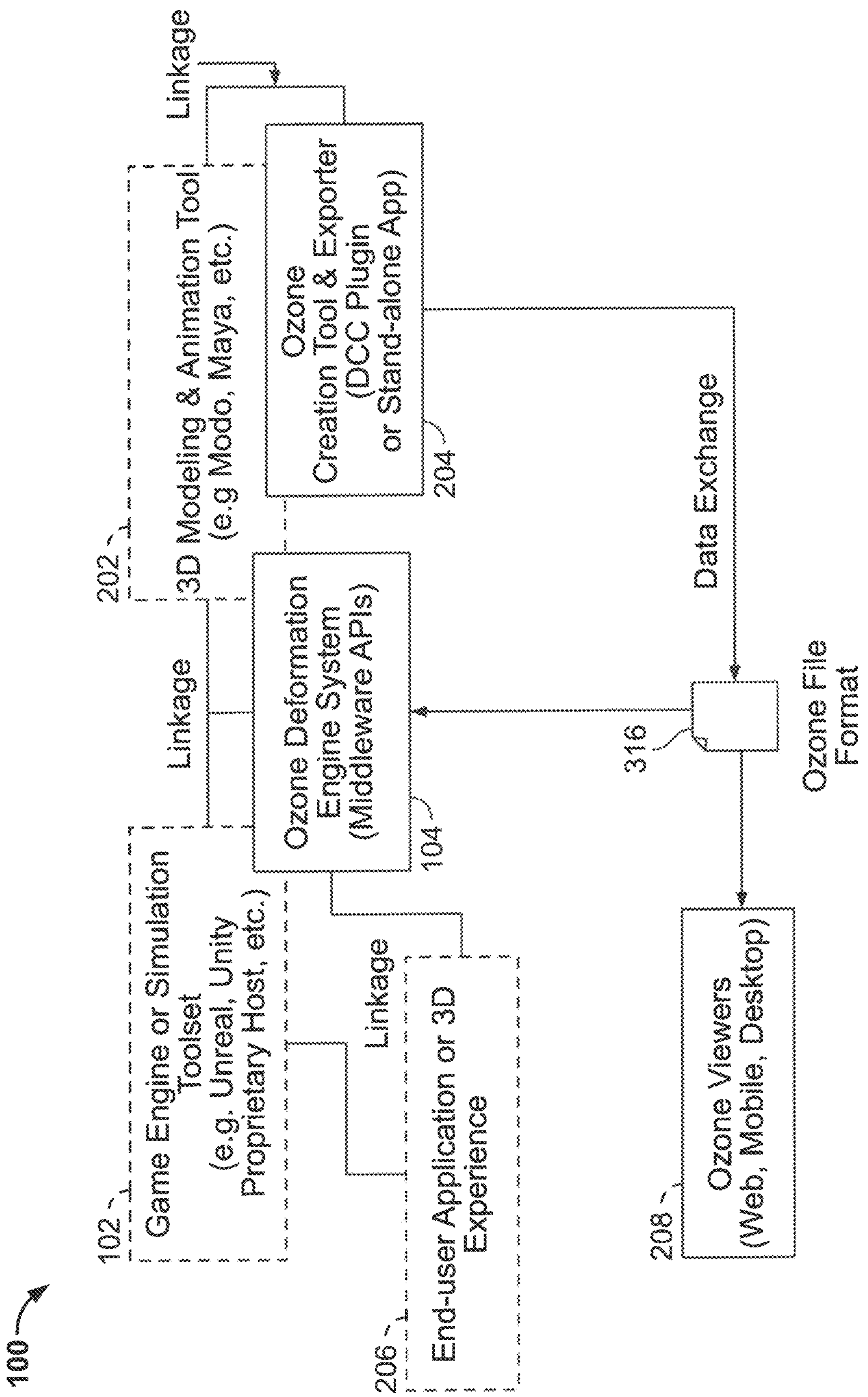
FIG. 2 is a block diagram of an example embodiment of the computing system shown in FIG. 1.

FIG. 2 is a block diagram of an example embodiment of computing system 100, including game engine system 102 and deformation engine system 104 (as shown in FIG. 1). As described herein, game engine system 102 may include a software-development environment, including one or more graphical user interfaces ("GUis") that may be used to create video games. Accordingly, and in general terms, game engine system 102 may include various tools that allow game developers to create video games. In at least some embodiments, as described herein, game engine system 102 may include a basic simulation toolset and/or framework and may be responsible for fundamental user input and audio/visual output processes, while deformation engine system 104 may facilitate, as a plug-in or other software extension, for motion and other detailed object and character deformation and/or translation aspects.

In at least some embodiments, game engine system 102 may include conventional deformation functionality, such as skin and bones functionality, as described above. In some cases, game engine system 102 may include a limited number of deformation options (e.g., typically an industry standard). As a result, object deformations created by game engine system 102 may be substantially lower-fidelity than those that can be achieved in combination with deformation engine system 104, such as for example, a quality that results in character or object stiffness, unnatural or unrealistic surface deformations and/or character motion, and the like.

For example, without the addition of deformation engine system 104, game engine system 102 may, in response to a developer input to form a smile on a character, be limited to creating or adjusting only certain portions of the character's lips, while other portions of the character's face are not deformed or are only poorly deformed.

To illustrate further, as described herein, in a traditional skin and bones system, such as game engine system 102 when it stands alone, realistic character development can be impacted by the fact that the motion and/or deformation of skin near the intersection of multiple bones in the character architecture are influenced by each bone. To accommodate motion at these bone intersections, it is commonly necessary to form a matrix or hierarchy of bone relationships, where each bone in an interconnected matrix of bones may affect the motion of every other bone. As a result, the motion and deformation properties associated with any given bone in a character or object skeleton are likely to affect the motion and deformation of other, linked, bones.

In algorithmic terms, this can result in a cascading series of deformations, each of which must be considered by a game developer when the developer alters the object appearance near a given bone. In complex character development, this frequently results in extremely time consuming, labor-intensive, design processes that are, even after careful attention to character design, somewhat low-fidelity, stiff in appearance, and the like. In at least one embodiment, the limited options provided by game engine system 102 as a stand-alone software and development tool may represent basic linear transformations that may include morph deformation, skin weight deformation and joint deformation. However, as described in additional detail herein, these and other shortcomings are remedied by the addition of deformation engine system 104.

In addition to game engine system 102, in the example embodiment, system 100 may also include a 3D modeling and animation tool 202 (or "animation tool"). Animation tool 202 may include any of a variety of suitable 3D computer graphics application tools, such as a digital content creation (DCC) software tool, that is used to create assets for 3D applications (e.g., video games, animated films, visual effects, etc.). In some embodiments, a user defines a virtual workspace (e.g., a scene) to implement and edit media. Animation tool 202, in various embodiments, may be MAYA, MODO, a CAD/CAM tool, any of the other conventional game engine systems described herein, and/or the like. In some embodiments, certain geometry and/or textures of an asset are initially prepared in animation tool 202. This produces a base model or base asset that is to be exported from the animation tool 202 to game engine 102 and/or deformation engine 104, such as in the form of an input file.

In some embodiments, animation tool 202 thus includes at least some conventional, or skin and bones, deformation functionality. For example, animation tool 202 may include a limited number of deformation options. As a result, the deformation created by animation tool 202 may be a low-fidelity deformation. The low-fidelity deformation may result in unnatural (or unrealistic) movements of a character. In some embodiments, the limited options of deformation of animation tool 202 are linear transformations that may include morph deformation, skin weight deformation and joint deformation.

Likewise, as described herein, in some embodiments the limited options of deformation of the animation tool 202 may be bounded. For example, the increase of fidelity of a first visual effect (e.g., improved realistic smile) based on using a first deformation option (e.g., morph deformation) may decrease the fidelity of a second visual effect (e.g., decreased realistic squint of an eye) based on using a second deformation option.

In some embodiments, animation tool 202 may include a 3D printing, robotics, or animatronics design tool, with primary focus being to design and analyze the shape and motion of static and dynamic physical (printed or assembled) characters.

In some embodiments, physical controllers 112 or input rigs, (sometimes referred to "waldos") and/or other commodity devices, such as game controllers, may act as inputs or input devices, which may provide input data to any of deformation engine system 104, animation tool 202, creation tool 204 and/or any combination thereof. These input devices may be used to pose and articulate an asset or asset deformation in real-time and/or save snapshots or recordings of states of the asset deformation (and corresponding channel values) for use later.

In some embodiments, motion tracking device 114 or other facial tracking systems may act as inputs into deformation engine system 104, animation tool 202, creation tool 204 and/or or combinations thereof. These inputs may map directly to joint-like channels or joint adapters provided by, for example, deformation engine system 104, and/or may map into pose mixing logic (e.g., as shown with reference to FIG. 4), and/or may map directly onto deformation rig channels, to produce new deformation results in real-time, and/or channel snapshots or recordings for use later.

System 100 may include various software applications (e.g., software for creation tool 204) that facilitate in the modeling and animation of assets in animation tool 202. In some embodiments, system 100 includes creation tool 204 that is used in conjunction with animation tool 202. For example, creation tool 204 may be a creation tool and/or an exporter. In various embodiments, creation tool 204 may be a digital content creation ("DCC") plug-in and/or a stand-alone application. In at least one embodiment, creation tool 204 includes one or more specialized tools for the creation of deformation and animation data of an asset.

Accordingly, as described herein, deformation engine system 104 may be communicatively coupled to game engine system 102 and/or animation tool 202. In at least one embodiment, game engine system 102 includes a plug-in (not shown) that is communicatively coupled to deformation engine system 104 and allows data to be transmitted between game engine system 102 and deformation engine system 104. Similarly, and in at least some embodiments, deformation engine system 104 may function as a plug-in or software extension to game engine system 102 to add a variety of functionality, such as functionality for creating higher-fidelity deformations and animations, to game engine system 102, which may as described, include a traditional third party skin and bones game engine system. Similarly, animation tool 202 may include, or function as, a plug-in (e.g., creation tool 204) that is communicatively coupled to deformation engine system 104 and allows data to be transmitted between the deformation engine system 104 and animation tool 202. Deformation engine system 104 may also be and/or include a middleware application. In some embodiments, deformation engine system 104 may also include one or more application programming interfaces ("APis"), such as for creating customized deformations, deformation channels, and the like.

In various embodiments, deformation engine system 104 may include functionality that provides for high-fidelity deformations of an asset (in contrast to conventional skin and bones deformation tools in game engine system 102 and/or animation tool 202 that provide for lower-fidelity deformation). As described herein, the high-fidelity deformations may result in improved natural (or realistic) movements of a character. For example, using deformation engine system 104, in response to an input to form a smile on a character, many portions of the lips of the character may be deformed to depict a smile. Additionally, other portions of the face may be deformed to depict a more realistic smile, such as, dimples created on the cheeks, curls are generated towards the ends of the lip, contraction of eyelids towards the ends of the eyes, and the like. As described in additional detail herein, these higher-fidelity deformations may be achieved using an order of operations deformation process, layers of deformations, independently tunable deformation channels, weight mapping, animated weight mapping, and/or a variety of other unique tools, systems, and processes available using deformation engine system 104.

In various embodiments, deformation engine system 104 may receive an input file, such as an input file that includes an asset geometry, from animation tool 202 and/or game engine system 102, which may include information about an asset, including for example, an asset geometry or mesh. In at least some embodiments, the asset geometry defined by the input file may exclude deformation information. As a result, the asset geometry received by deformation engine system 104 may be referred to herein as a "naked geometry," inasmuch as the asset geometry excludes deformation information when it is received by deformation engine system 104. In some embodiments, the asset geometry may also include one or more predefined or pre-existing deformations, which may, for example, have been pre-applied previously using deformation engine system 104 and/or using a traditional game engine system 102. Deformation engine system 104 may, in response to receiving the input file, be implemented or used to apply one or more deformations to the asset, such as using deformation tools of the deformation engine system 104 to create one or more high-fidelity deformations (rather than, for example, the asset being limited to deformations performed using only the limited deformation tools of the animation tool 202 or game engine system 102).

In addition, in at least some embodiments, the input file may include a collection of triangles and/or n-sided polygons to define the asset geometry. In some embodiments, the input file may include one or more texture coordinates on the asset geometry and/or a directed graph or list ("DAG") of developer-chosen deformers, such as a deformation stack, as described herein, a list or graph of deformer types, portable code for customer deformers, and/or weight maps describing how the deformers in the stack, list, or DAG are bound to or associated with sections of the asset geometry. In some embodiments, the input file may include (e.g., for each deformer in a DAG) one or more weight maps or weightings that bind subsets or portions of an asset geometry to zero or more deformers. In some embodiments, an input file may include poses (e.g., restorable states of channel values), as described herein, and/or clips (e.g., animated poses). In some embodiments, an input file may include instructions in the form of state machine and/or an abstract syntax tree ("AST") describing zero or more custom deformer functions. In some embodiments, an input file may include cached values of subdivision and/or surface solutions, and/or metadata, such as units of measure, world orientation, and/or XYZ handedness parameters or values. In addition, in some embodiments, an input file may include any of the foregoing and/or other parameters, variables, values, definitions, and the like, as described elsewhere herein. In various embodiments, the input file format may be encoded in a portable format, as described in additional detail herein, that loads and/or is capable of being loaded in any of the DCCs described herein and/or on any suitable computing platform (e.g., mobile, console, desktop, cloud, and the like). In other embodiments, the deformation engine system 104 may allow the user to extend the base functionality of deformation engine system 104 by way of a plug-in architecture. Such plug-ins may provide new deformation operator types. When any plug-ins are detected by deformation engine system 104 during operation, deformation engine system 104 may, in turn, inform animation tool 202 and/or creation tool 204 (if in use) of the available plugin(s), presenting them to the users of animation tool 202 and/or creation tool 204 for their use and configuration. Moreover, these plug-ins may be included in the rig file format 170.

In some embodiments, deformation engine system 104 is a real-time deformation and animation engine. That is, deformation engine system 104 may generate a deformation of an asset in real-time. In some embodiments, deformation engine system 104 includes various non-linear transformation tools for generating high-fidelity deformation of an asset. In various embodiments, the deformation options provided by deformation engine system 104 are unbounded. That is, a number of deformation operations may be utilized to perform a deformation of a character where the individual deformation operations do not affect one another, as described elsewhere herein. Moreover, as described herein, in various embodiments, deformation engine system 104 is an order of operation deformation engine. In general, as described elsewhere herein, order of operations deformation may include a deformation pattern of individual deformation operations relating to the movement and/or deformation of an asset. For example, an order of operations deformation implemented by deformation engine system 104 may sequentially implement different deformation operations to create a high-fidelity deformation.

In various embodiments, deformation engine system 104 may be implemented natively within gaming engine 110 and/or animation tool 202. That is, deformation of an asset may be executed in real-time by deformation engine system 104 rather than the conventional skin and bones deformation tools of gaming engine 110 and animation tool 202. As such, the deformers of the deformation engine system 104 may be translated natively into game engine system 102 and/or animation tool 202.

System 100 may include end-user application 206 (also referred to herein as "application 206"). In various embodiments, the end-user application 206 receives a build package generated by game engine system 102. The build package (e.g., an end-user application bundle) may include the final content for a particular application or experience for release. In one embodiment, the build package includes the deformed assets that are generated by the deformation engine system 104. In another embodiment, the build package includes a version of the deformation engine runtime along with the deformation-ready form of the asset, so that the content of the experience may include interactively (according to user input, artificial intelligence, etc.) deformed models in real-time. In at least some embodiments, deformation engine system 104, and the associated build package and/or file format, are both designed to run across a wide range of devices, including for example, mobile devices, game consoles, desktop PCs, cloud-based computing devices, and the like. As described herein, at least one technical improvement associated with these capabilities is that digital experiences may be deployed across very differently capable hard\vare systems, such as from portable low energy devices to high performance gaming consoles, desktops, and cloud rendering systems.

In various embodiments, before an animation project (e.g., a video game) is distributed to users, the animation project is packaged in an end-user application bundle. The bundle ensures that requisite code and content is up to date and in the proper format to run on the desired target platform.

System 100 may include one or more viewers, such as viewer 208. Viewer 208, in various embodiments, may be configured to open, modify and/or play files generated by deformation engine system 104. Viewer 208 may be executed within a web browser, mobile operating systems, desktop operating systems and the like. Viewer 208 may expose some or all of the deformation channel inputs and outputs of the deformable model for user inspection and/or modification, and/or modify other values specific to the deformation engine.

Figure 3:
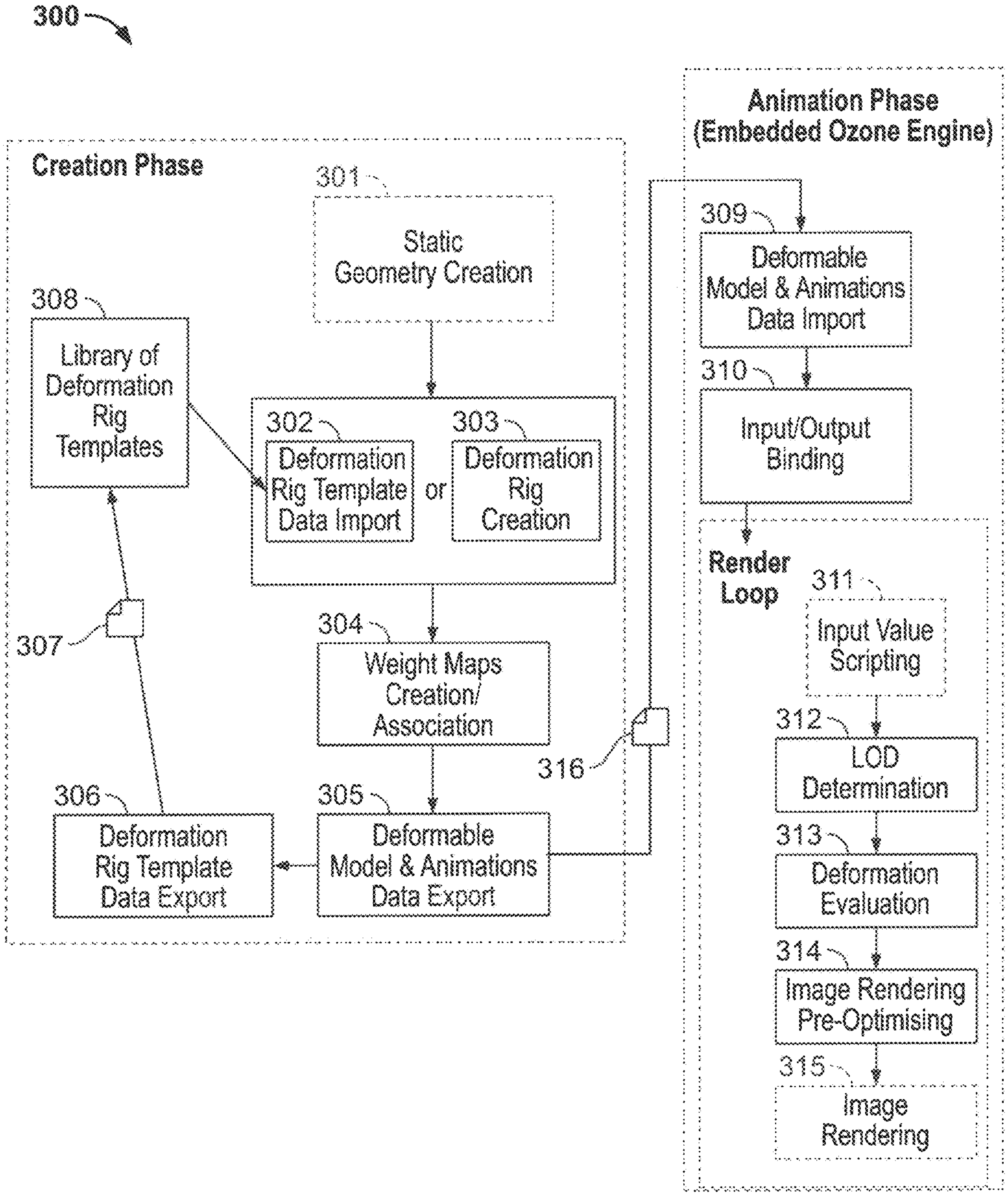
FIG. 3 is a flowchart of an example embodiment of a process for computer animation, including performing deformation using the systems shown in FIG. 1 and FIG. 2.

FIG. 3 illustrates a process 300 of layered order of operations deformation, according to at least one embodiment. Accordingly, at step 301, a static geometry of a 3D animated asset, such as a 3D character, is created. For example, a user creates an asset via animation tool 202. The asset may include geometry, texture, and the like. In at least one embodiment, the asset created via animation tool 202 does not include one or more of rigging, deformation and animation. Rather, as described above, the asset may be "naked," inasmuch as the asset includes a mesh, but has not had any deformations applied.

In at least one embodiment, at step 302, deformation engine system 104 (e.g., in some cases, in association with animation tool 202 and/or creation tool 204) may apply a prebuilt rig template to the imported asset geometry. In general, a prebuilt rig is a rigging, including one or more deformations, that can be associated with various assets. For example, a rigging may be created for a first asset (e.g., a sea creature). The rigging may be subsequently used for a second asset (e.g., a humanoid). As a result, in at least some embodiments, a naked asset may be quickly fitted or rigged to include predefined deformations previously created for another asset, which may be the same as or different from the naked asset. As described in additional detail herein, this may facilitate the rapid addition of multiple assets to a game under construction, where for example, an existing rigging may be applied to multiple naked assets.

As described herein, in at least some embodiments, custom (e.g., user-defined) deformers may be configured by the user and stored in a file format associated with deformation engine system 104 (e.g., file format 316). Within the file format 316, the deformers may be defined using an AST (abstract syntax tree) and/or data flow graphs, combining basic operators to define the deformer behavior. Alternatively or additionally, in at least some embodiments, the developer may supply more complex custom deformers 205 via dynamic linkage directly to deformation engine system 104. Once a custom deformer 205 is defined, it may be utilized with all the capabilities afforded to standard deformers built into the system 104, as described herein.

On the other hand, in at least some embodiments, at step 303, deformation engine system 104 (e.g., in some cases, in association with animation tool 202 and/or creation tool 204) may be used to apply a non-prebuilt rig template to the imported geometry. For example, a gaming developer, animator, or modeler may create a rig, including one or more deformers, for a particular asset by adding one or more deformers to the asset.

At step 304, as described in additional detail herein, deformation engine system 104 (e.g., in some cases, in association with animation tool 202 and/or creation tool 204) may be used to connect a deformation operator in the deformation stack of an order of operations deformation stack to one or more weightings or weight maps. In various embodiments, weight maps may be connected to more than one deformation operator.

At step 305, deformation engine system 104 (e.g., in some cases, m association with animation tool 202 and/or creation tool 204) may bundle asset parameters, including various deformers (such as deformers selected by and/or calibrated by a user) into an output file (e.g., output file 316). For example, deformation engine system 104 may bundle geometry, deformation layers (e.g., layers that affect geometry, UV and/or time-domain), weight maps, animations, rigs, exposed or user-selected input channels, exposed or user-selected output channels, and the like. In various embodiments, output file 316 may be transmitted to game engine system 102 (and/or a simulation engine) to be executed by the game engine system 102, such as an instance of game engine system 102 running on a personal computer or game console and configured for gameplay by a player.

In at least one embodiment, output file 316 corresponds to a deformable character ready for use in a video game or other visual media. In various embodiments, process 300 includes the creation of multiple output files 316 that correspond to respective deformable characters in a video game. For example, a first file 316 corresponds to a first deformable character, a second file 316 corresponds to a second deformable character, and so on.

At step 306, deformation engine system 104 (e.g., in some cases, in association with animation tool 202 and/or creation tool 204) creates a "trimmed" output file 307. That is, trimmed output file 307 may be created to include only a portion of data that is included in file 316. In one embodiment, the trimmed output file 307 includes at least one of a deformation rig and a weight map set.

Trimmed output file 307 may be stored in a library 308 that includes a plurality of deformation rig templates. The library 308 may include a collection of rigs accessible for future deformable models. In at least one embodiment, the rigs are created/authored by a user. The collection of rigs may be searchable by rig characteristics such as the number of operators/layers, computational complexity, character type (e.g., biped, face, etc.), level of detail (LOD) support, etc. In various embodiments, deformation rigs that are created at step 303 may be stored in library 308.

At step 309, output file 316 may be loaded by a game engine system 102 that includes deformation engine system 104. In at least one embodiment, the geometry in file 316 is converted into an optimal format. In various embodiments, step 309 corresponds to launching a video game by game engine system 102 that includes deformation engine system 104. That is, the play session of a video game is initiated at step 309.

At step 310, the information in file 316 may be bound to or associated with one or more game logic variables. As a result, other game logic may configure deformation parameters. In various embodiments, the character and rigging are connected to controls of host applications (e.g., game engine system 102 and/or animation tool 202).

Steps 311-315 are related to a render loop executed by game engine system 102 and/or deformation engine system 104. For example, during the execution of a video game, a user provides input to change a character in the video game to include a smile, such as using a hand-held controller. The deformation of the character's face to include a smile is executed through the render loop. In particular, the deformation of the face of the character to implement the smile occurs in the render loop. As a result, the deformation generated within the render loop is a real-time high-fidelity deformation during the execution of the video game. Stated another way, the inclusion of deformation engine system 104 in the gameplay system (e.g., a console computing device) facilitates application of the deformations provided during asset creation, as described herein.

Accordingly, at step 311, game engine system 102 performs input value scripting. For example, during the processing of each frame by the game engine system 102, new values for game logic variables or animation clip values may be fed into deformation engine system 104.

At step 312, deformation engine system 104 may determine a level of detail (or "LOD"). Additionally, the deformation engine system 104 may execute one or more sub-graphs. In one embodiment, the execution of one or more sub-graphs is based on heuristics such as a model's predicted size on a screen and quality targets defined by the game engine system 102 (or simulation engine).

In one example, during a multi-participant game while in the game view, a first participant is a first distance (e.g., 2 feet) away from a player and/or second participant, and the first participant is a second distance away (e.g., 50 ft) from the player and/or a third participant, where the second distance is greater than the first distance.

The deformation engine system 104 may, as a result, determine the first distance and the second distance. Rather than deform both the second participant and the third participant at a high-fidelity, the deformation engine system 104 may deform the second participant at a high-fidelity and deform the third participant (which is farther away) at fidelity lower than the high-fidelity associated with the second participant. As a result, at least one technical improvement associated with this real-time deformation of assets based upon distances from a player and/or other participants is that a smaller amount of computational time is spent on the deformation of at least the third participant (as compared to the second participant). Stated another way, it may not be necessary to apply the same level of deformation or detail to characters that are further away from a given player or character, because the details would not be visible anyway. In one embodiment, the deformation engine system 104 deforms a first set of deformation layers for the second participant having a higher LOD and deforms a second set of deformation layers (less than the first set of deformation layers) for the third participant having a lower LOD.

At step 313, deformation engine system 104 evaluates/calculates the deformation of a character. In one embodiment, deformation engine system 104 updates the internal state of the geometry deformation, such as vertex locations, UV or mapping coordinates, etc. For example, a face of a character is deformed from a neutral expression of the mouth to a smile. If, during asset creation and/or deformation, the user or artist has provided one or more custom deformation operators, then it is also during 313 that these operators may be executed if needed and if available.

In various embodiments, deformations performed by deformation engine system 104 may include, but are not limited to the following mathematical or numerical operations: translate, rotate, scale, curve: slide, curve: rotate, curve: scale, curve: warp, morph, single-axis bend, slide on surface, relax, wrap, lattice, sphereize, item influence deformer, multi-axis bend, multi-axis multi-bend, constraint: position, constraint: rotation, constraint: scale, constraint: aim, constraint: project to surface and so on. In various embodiments, a user may define a pose of a character (e.g., a smile) that is a combination of one or more deformations.

At step 314, the deformation engine system 104 may pre-optimize image rendering. In one embodiment, the deformation engine system 104 prepares deformed geometry for upload to a GPU and/or CPU. Whether for a GPU or CPU, the deformation engine system 104 may identify which geometry buffers and caches (or parts thereof) should be updated. In at least one embodiment, the deformation engine system 104 manages a pre-allocated vertex buffer sufficient to contain the results of geometry subdivision. In one embodiment, the deformation engine system 104 manages or supplies the game engine 102 or DCC with GPU programs for on-GPU geometry generation or on-GPU deformers. In one embodiment, it is determined that at least a portion of an object in the video game is off of the screen. In particular, various heuristics and algorithms are used to update geometry metadata that is provided to the game engine such as when an object or asset is off the screen. As a result, a GPU and/or CPU do not execute geometry associated with the portions of the object or asset that are not displayed on the screen. At least one technical improvement associated with pre-optimization may thus include faster processing times as well as lower memory requirements. For example, determining that a portion of an asset appears off-screen during gameplay may speed processing and reduce memory allocation requirements, because the off-screen portions of the asset do not need to be rendered or deformed.

At step 315, game engine system 102 may execute image rendering based on the deformation performed by deformation engine system 104. In one embodiment, after an asset's geometry is updated (e.g., on a GPU), the game engine system 102 may conclude the frame with a rasterization process to produce the final image.

Figure 4:
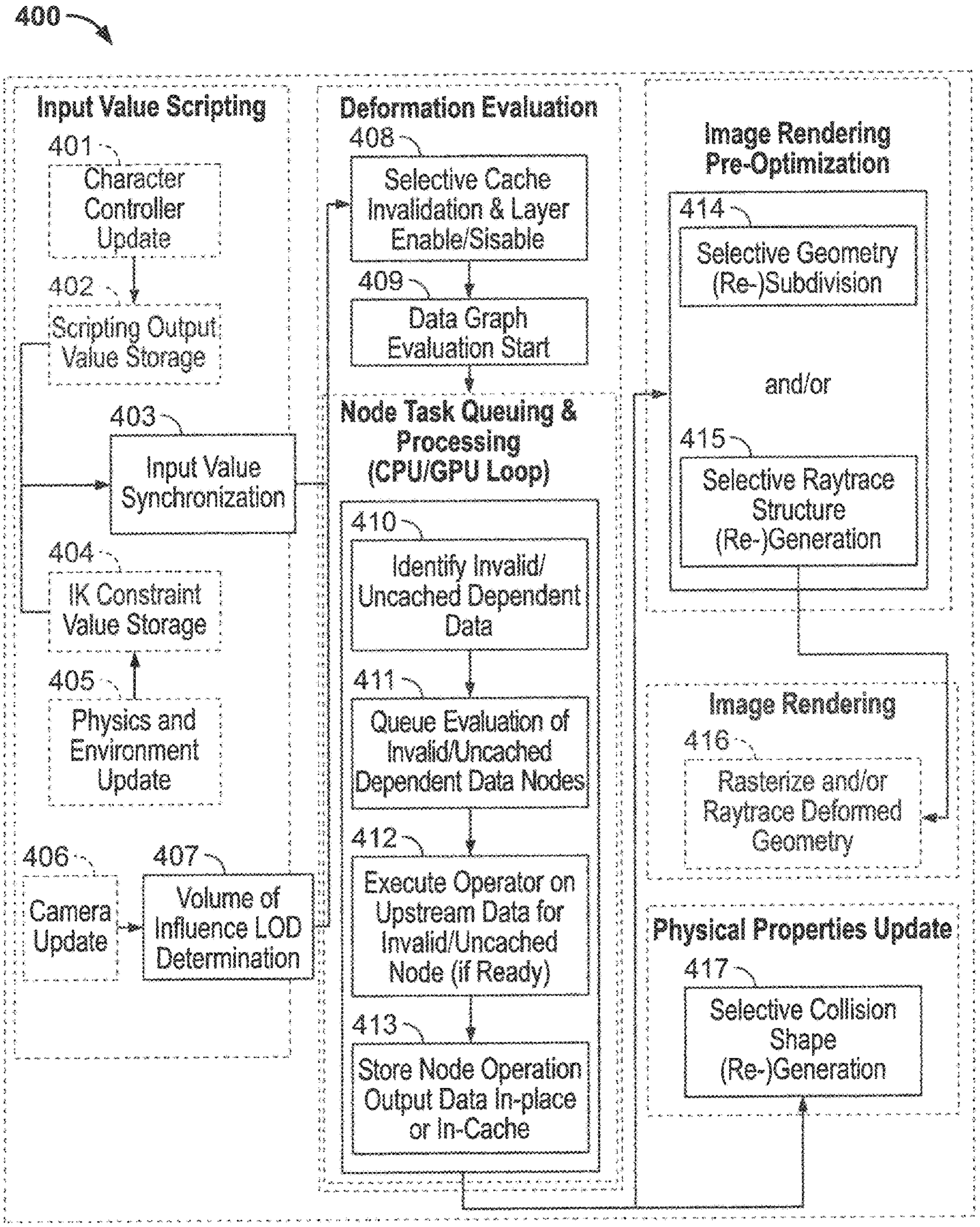
FIG. 4 is a flowchart of an example embodiment of a process for computer animation, including performing an animation phase render loop using the systems shown in FIG. 1 and FIG. 2.

FIG. 4 illustrates an example process 400 of an animation phase render loop, such as during an animation phase that may occur during gameplay, according to at least one embodiment. In various embodiments, steps 401-407 may be associated with input value scripting, such as step 211 of FIG. 2. At step 401, characters/objects are updated at game engine system 102. The characters/objects may be updated via artificial intelligence (AI) and/or user control. For example, in response to user input (e.g., a user selecting a button on a game controller), a character or asset moves within the gaming environment.

At step 402, the game engine system 102 may perform scripting output value storage. For example, in one embodiment, preliminary results of scripting/AI and user input are provided. A subset of the preliminary results may be relevant to the deformation and animation of the asset.

At step 404, the game engine system 102 may perform inverse kinematics (IK) constraint value storage, as those of skill will appreciate. In one embodiment, physics constraints from the game environment or game world and/or other spatial objectives (e.g., reach targets) are computed. In at least one embodiment, step 404 is performed in combination with step 403. In at least one embodiment, step 404 may be optional based on the creator's or artist's goals. For example, IK functions of game engine system 102 may or may not be on and running. As such, if game engine system 102 is off, the deformation engine system 104 remains functioning with other inputs. Stated another way, in at least some embodiments, deformation engine system 104 may function in place of game engine system 102 to facilitate gameplay without the assistance of game engine system 102 and/or without the assistance of at least some functionality, such as IK functions, typically provided by game engine system 102.

At step 405, the game engine system 102 may perform physics and environmental updates. In at least one embodiment, physical objects or assets in a scene are updated. This provides new data about the shape of the game environment or world around the animated deformable object or asset. In at least one embodiment, step 405 is performed in combination with step 401.

At step 406, the game engine system 102 may receive camera updates, such as based on the motion of a player's character within the game environment, and as controlled by the player to move within the game environment. In one embodiment, the camera updates may include camera position, frustum, occlusion, ray trace settings, etc.

At step 407, the deformation engine system 104 may determine the volume of influence associated with the deformable model or asset in order to select an optimal set of deformation layers to enable or disable, optimizing for visual quality target and for available CPU/GPU budget as determined by the simulation developer and/or game engine system 102. For example, in response to the size of the camera frustum being determined, the size of a given deformable feature (e.g., a smile) on the display device (e.g., display device 108) may be determined. In at least one embodiment, the deformation engine system 104 determines which deformers and influences (e.g., reflection, color bleeds, etc.) are needed for deformation of a deformable object or asset. For example, the deformation engine system 104 may use camera information in relation to the deformable object or asset to make determinations about a variety of deformers that should be applied during gameplay.

At step 403 (e.g., upon the completion of one or more of steps 401-407), the game engine system 102 may perform input value synchronization. In one embodiment, values used for modifying a deformable model or asset are transmitted to deformation engine system 104. The values may include a character's look direction, the position of objects attached to the character, relative location, shape of the ground beneath the character, etc. In response to receiving these values, deformation engine system 104 may apply one or more deformations to the asset, such as to deform portions of the asset's geometry in response to the asset's look direction, and the like.

In some embodiments, an asset (e.g., one object, character, actor, etc.) may have a dependency on another asset (e.g., another object, character, actor, etc.). To account for the dependency, in at least some embodiments, the coordinate systems maps of one or both assets may be resynchronized, such as to ensure these generally independently moving assets have proper dependency values updated between them before deformation evaluation. For example, the deformation of a first asset's arm may depend on knowing the deformation results of the second actor's arm, both actors located potentially arbitrarily apart from one another in the world space.

In some embodiments, zero or more target points (which may also be referred to as control points and/or points of interest) may be emitted or provided from a deformation rig, such as for example the crown of a character's head, or a tip of the character's right index finger, or a location of the bottom of the character's necktie, to give just a few examples. In other embodiments, these target points may also include an orientation, frame, normal, tangent, and/or other orientation vectors, which are deformed correspondingly with the surface of the deformed character. This information may be queried by a rendering engine included in game engine system 102 and/or deformation engine system 104 and used in other scripting activities or physics activities in the current iteration of the loop and/or or more subsequent iteration(s).

Steps 408 and 409 are associated with deformation evaluation, such as in at least one embodiment, step 313, as described above. At step 408, the deformation engine system 104 performs selective cache invalidation and/or layer enable/disable (such as according to the results of step 407). In at least one embodiment, based on the input value synchronization (at step 403), individual deformers are enabled/disabled, and input values are updated if they are changed.

In at least one embodiment, selective cache or selective caching is implemented. That is, previous work regarding a deformable object or asset may be used for current deformation of the deformable object or asset. For example, if the deformation of a smile has not changed from a first frame to a second frame, then the computation of the deformation of the smile may be skipped for the second frame because it was already computed for the first frame. At least one technical improvement associated with selective cache or caching is that processor speed may be improved and/or memory allocation requirements reduced by the recycling of deformation information from frame to subsequent frame for assets that have not changed or moved and/or assets or portions of an asset that do not otherwise require any visual refresh.

At step 409, data graph evaluation may be started. In at least one embodiment, deformation engine system 104 may determine that the systems (e.g., data dependencies) are ready to begin evaluation by the deformation engine system 104.

Steps 410-413 are associated with node task queuing and processing (e.g., in a CPU/GPU loop). In at least one embodiment, these steps may assign parallelizable deformation computations to multiple independent threads, and/or multiple independent CPUs/GPUs. In at least one embodiment, task queuing may also cross-compile to or re-compile to or dynamically link with CPU/GPU architecture-optimized deformer computation routines, such that the same asset performance is possible regardless of device type, in a manner most time-efficient for the device type(s) present. In at least one embodiment, steps 410-413 may correspond to step 313, as described above.

Accordingly, at step 410, deformation engine system 104 may identify invalid/uncached dependent data. For example, the deformation engine system 104 may determine what output data is requested, such as by game engine system 102 and/or in response to a player input to control an asset during gameplay.

At step 411, deformation engine system 104 may queue evaluation of invalid/uncached dependent data nodes. In at least one embodiment, deformation engine system 104 builds an ordered task list of deformable objects or assets to evaluate. This may account for information gathered or set in previous steps to determine the least amount of work that can be done to achieve the desired result.

At step 412, the deformation engine system 104 may execute an operator, such as a deformation operator or deformation channel, on upstream data for invalid/uncached nodes (if ready). In one embodiment, the operator may complete work on changing the input data. This may be done by either (1) creating new output data, or (2) modifying input data in place.

At step 413, the deformation engine system 104 may store node operation output data in-place or in-cache. In one embodiment, the computed data is either (1) stored over the original data, or (2) set as a new output data. An evaluation system, such as of game engine system 102 and/or deformation engine system 104, may then be notified that the work has been completed. If the user or artist has provided one or more custom deformation operators, then it may also be during step 412 that these operators are executed if needed and if available.

Steps 414 and 415 are associated with image rendering pre-optimization, such as step 314, as described above.

At step 414, the deformation engine system 104 may perform selective geometry subdivision or re-subdivision. In at least one embodiment, a subset of renderable sub-divided meshes vertex positions are calculated and updated, selectively so as to focus sub-division or sub-division updates where visual fidelity is needed most for the current iteration of the animation or rendering loop. The calculations may be based on the parts of the data (e.g., mesh data) that have been altered in the processing step. Moreover, the computation expense may be decreased by reusing work from a prior frame. As a result, as described herein, at least one technical improvement may be that processing speed is improved and/or that memory requirements are reduced.

In at least some conventional systems, to deform a model or asset, a large number of points on the mesh of a model or asset may need to be moved, which may be computationally expensive. As such, in the example embodiment, it may be desirable to move the least amount of points yet still maintain a high-fidelity. In at least one embodiment, a low-resolution geometry may be used as input to deformation evaluation, in combination with step 414, which may convert the post-deformation geometry state back up to a high-resolution geometry estimate using a triangle subdivision algorithm. As a result, a lesser amount of points may still be used to create a high-fidelity deformation of an asset.

At step 415, the deformation engine system 104 may perform selective ray trace structure generation or regeneration. In at least one embodiment, a subset of the ray tracing acceleration structure is updated. The subset is based on the parts of the data (e.g., mesh data) that have been altered in the processing step, as well as the degree to which they have moved with respect to ray tracing acceleration structure bounding volume tolerances (configured by the deformation engine), as well as the degree to which subdivision results are necessary for the particular ray tracing effect required by the game engine system 102 or DCC, for example low-fidelity ray tracing acceleration structures may be sufficient (and faster to compute) for some ray tracing effects requirements. The updating may be none, some, all, or an approximated (fast) subset of data for the ray tracing acceleration structure.

Step 416 corresponds, in some embodiments, to image rendering, such as step 315, as described herein. At step 416, the game engine system 102 may perform rasterization and/or ray trace deformed geometry. In at least one embodiment, upon the deformable model's or asset's geometry being updated on the GPU (and/or CPU), the game engine system 102 concludes the frame with its rasterization process to produce a final image. In at least one embodiment, step 416 corresponds to the output that is displayed at the end-user application 206.

Step 417 corresponds to updating physical properties. In various embodiments, step 417 may be the same or similar to step 405. In at least one embodiment, an animated object or asset corresponds to a physical object or asset (e.g., for the purposes of physics simulation). This step analyzes the resulting deformation. Additionally, based on the nature of change compared to the last frame and other factors, the deformation engine system 104 performs an optimized update to the collision shape and other physical properties needed by the deformation engine system 104. The other factors may be desired physics fidelity, coherence, and importance (e.g., size on screen).

Figure 5:
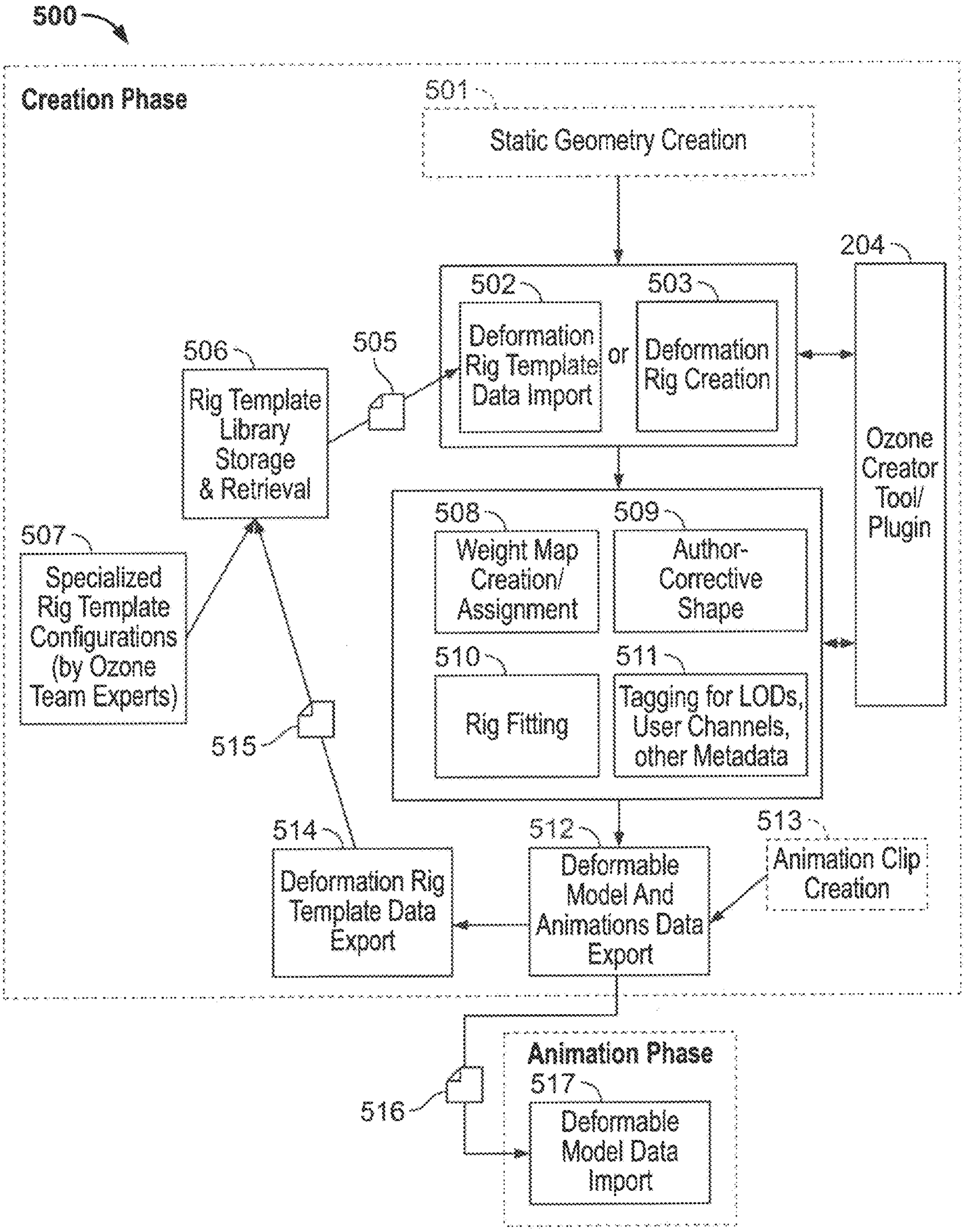
FIG. 5 is a flowchart of an example embodiment of a process for computer animation, including creating a deformable model using the systems shown in FIG. 1 and FIG. 2.

FIG. 5 illustrates an example process 500 for creating a deformable asset or model. In at least some embodiments, process 500 may be the same as and/or similar to the creation phase of a deformable model in process 200, for example as described herein. Moreover, as described herein, creation of a deformable asset or model, including application of one or more deformers to an asset or model, may be performed using deformation engine system 104.

At step 510 deformation engine system 104 (e.g., in some cases, in association with animation tool 202 and/or creation tool 204) may import a base model or base asset, such as a naked asset geometry, as described herein. The base model may include geometry, texture, and in some cases, other detail. However, as described herein, no deformers may be applied to or included in the base model or base asset at the time of import. Accordingly, the base model or base asset may be imported into deformation engine system 104 for rigging, deformation, animation, and the like, as described herein.

Accordingly, at step 501, in at least some embodiments, a prebuilt deformation rig is applied to the imported geometry. In some embodiments, at step 503, a new deformation rig, which may as described herein, include deformations, deformation channels, and the like, may be created from scratch and/or populated or recycled from an existing deformation template, such as an existing template applied to a different asset.

In various embodiments, one or more outputs of steps 501 and/or 503 may be imported into deformation engine system 104. As described herein, in various embodiments, deformation engine system 104 may include specialized tools, such as specialized tools for developing custom deformations (e.g., as described, for example, with reference to FIGS. 6-21), for the creation of deformation and animation data.

At step 508, weight maps may, as described herein, be created and assigned to an asset, or portions of an asset, with defined weight values to the geometry. In one embodiment, an artist may apply weights to various portions of an asset, such as a character, such as on/near the lips of the character and/or at any other asset location. The weight maps may overlap one another or may not overlap one another, such as in one or more layers. In one embodiment, the artist may also attach additional semantics to the map, for example whether that map or operator is for a "jaw up/down" movement, or "eyeball left/right" movement. This information may be used later to assist with exporting a description of motion requirements for producing physical versions of the model.

Additionally, and to illustrate further, it may be desired for a character to smile or to include another expression. The character may have various deformation layers (e.g., using non-linear deformation operators or deformation channels). In response to a user input to create a smile on the model or asset, it may be determined what sub-sets of the model should be affected by the non-linear deformation operators. Various deformation layers (or non-linear deformation operators) may include a jaw opening to the right, a jaw opening to the left, a portion of a smile on the right side of the lips, a portion of a smile on the left side of the lips, a portion of a smile in the middle of the lips and so on.

At step 509, author-corrective shapes may be created. In one embodiment, corrective shapes (e.g., user manipulated vertex shaping) may be created or developed to augment and complement the final deformed shape. The corrective shapes may be an optional type of deformation created to allow the deformed shape for final touches or nuance. The corrective shapes may themselves be applied gradually within the rig, with strength configurable to depend on other channel values in the rig. For example, a forehead wrinkle corrective shape can be configured to appear strongly when eyebrows channel values are high, and to be nearly invisible in effect when eyebrows channel values are low.

At step 510, a rig fitting may be performed. For example, either pre-built rig templates and/or custom created rigs may be fit to an asset geometry. Additionally, weight maps may be created and attached to the asset geometry. Additional certain types of deformers which use control points or control lines may have such points or lines adjusted at this time as well (see, e.g., FIG. 17).

At step 511, tagging for LODs, user channels and/or other metadata may be performed. In at least one embodiment, a user, such as an artist, identifies layers in the deformation rig and associates them with one or more LOD groups or LOD importance levels. In various embodiments, the output of one or more of steps 508, 509, 510 and/or 511 are provided to and/or facilitated by deformation engine system 104.

At step 512, deformation model data and animations data may be exported, such as to output file 316, as described herein. For example, deformation engine system 104 (e.g., in some cases, in association with animation tool 202 and/or creation tool 204) may bundle asset geometry, deformation layers (e.g., layers that affect geometry, UV and/or time-domain, and other parameters), weight maps, animations, rigs, exposed or user-selected input channels, exposed or user-selected output channels, and the like. In various embodiments, output file 316 is transmitted to game engine system 102 (or a simulation engine) and is ready to be loaded and executed by the game engine system 102 with the aid of deformation engine system 104, as described herein.

At step 513, animation clips may be created by the user or artist. For example, an animation may be created using deformation engine system 104 (e.g., in some cases, in association with animation tool 202 and/or creation tool 204). In various embodiments, the geometry may be bound to a rigging and subsequently bundled into one or more files (e.g., output file 316, a pose file, etc.)

In some embodiments, static poses, with optional human-readable names, may be created by the user or artist. These poses may be bundled into the saved output file 316 and/or into another file, such as for pose blending and/or retrieval later. As described herein, these poses may include collections of key value pairs, such as deformer channels, where one or more of the key value pairs or channels available on the deformation rig may have pre-set values.

In some embodiments, the game developer, artist, or user may choose to select subsets of existing poses to be combined to form new poses. For example, and to illustrate, the user may choose to combine the eyebrows subset of channels of an "angry" pose with the lips subset of channels of the "shocked" pose. They may then assign a new name to this new pose, such as "angry-shock," for subsequent saving. In some embodiments, the user may choose to combine multiple poses through weighted blends, with independent weights per blended pair of channels, then assigning a new name to this resulting pose for subsequent saving.

In at least some embodiments, before and/or before step 512, the user may initiate a pose actuation analysis. This pose actuation analysis may receive as one or more inputs, one or more physical material properties (such as type or thickness of metal or plastic), to produce a description of one or more actuator calibration values needed, and description of material properties, such as metal or plastic creases, hinge locations/types, and the like, to enable preparation for 3D printing or assembly of a physical or animatronic version of this deformable rig. For example, a 3D printer communicatively coupled to deformation engine system 104 may receive a rigged asset, including actuator calibration values and/or one or more material properties, to produce a real-world physical 3D model of the rigged asset.

In some embodiments, this pose actuation analysis may also warn the developer of problematic poses or deformation stack configurations which would not leave sufficient internal passageway or safety for animatronic cabling, either signal or actuation cabling, or warn the developer of problematic poses or deformation stack configurations which would not leave sufficient space for installation of other components such as synthetic eyeballs. In some embodiments, the developer's design of the deformation stack and weight maps are analyzed according to their possible range of motion and effects of range of channel values to automatically produce segmentations to the asset geometry, such as independent segments the user may choose to tag as eyes, ears, neck, etc. Moreover these automatic segmentations may also include automatic recommendations for material type to utilize for each segment, for example segments which prominently show wrinkles in the deformation rig system may identify a type of latex covering suitable for showing the same degree of wrinkling when physically deformed. This automatic segmentation may then be used to assist in 3D printing of assembly-ready physical statues or animatronic models. The automatic segmentations may also include parameters for smoothness or curvature, such as $0^{th}$ order or $1^{st}$ order, etc. continuity of curvature across segmentation boundaries.

In some embodiments, such as during or before step 512, the user may choose to export a deformation rig in a legacy format, such as skin cluster or skin and bones system format. Because this legacy format has limited capabilities by comparison to the order of operations format created by deformation engine system 104, not all order of operations capabilities may be perfectly representable in this legacy format. Therefore, in at least some embodiments, and optionally given a target maximum number of bones from the user, an automated generation of bone counts, bone topology, and skin cluster weights, may be calculated to best approximate the original behavior of the order of operations-based deformation rig, and the rig may be exported to the legacy format.

At step 512, the user may also choose to "compile" a run-time optimized version of the order of operations deformation rig. This optimization process may include detection of redundant or unused rig channels or operator instances, minimally used or minimal-effect rig channels, operator instances, or unnecessary weight maps, and simplify or remove such during the file save. This optimization process may also perform a machine-learning process, by synthesizing a training set composed of prominent or pose-referenced channel value sets, and regions of deviation centered thereabouts, to train an inference model approximation to the deformation rig instance. This inference may be optimized for execution on hardware-accelerated inference systems, such as GPU or TPU (tensor processing units) based technology. For some types of 3D models, at least one technical improvement is that this resulting inference-based deformation system will see superior memory use and/or runtime speed performance.

At step 514, deformation engine system 104 (e.g., in some cases, in association with animation tool 202 and/or creation tool 204) may create a "trimmed" file 515. In at least one embodiment, the trimmed file 515 includes at least one of a deformation rig and/or a weight map set.

Trimmed file 515 may, as described herein, be stored in library 506 that includes a plurality of deformation rig templates. The library 506 may include a collection of rigs accessible for future deformable models. In one embodiment, the rigs are created/authored by the user, such as in the form of templates 507. The collection of rigs may be searchable by rig characteristics, such as the number of operators/layers, computational complexity, character type (e.g., biped, face, etc.), level of detail (LOD) support, etc. The file 516 produced in general may include deformation rig configurations, poses, clips, geometry, geometry texture data, and any combination thereof.

Example Order of Operations and Weighting Using the Deformation Engine System

Figure 6:
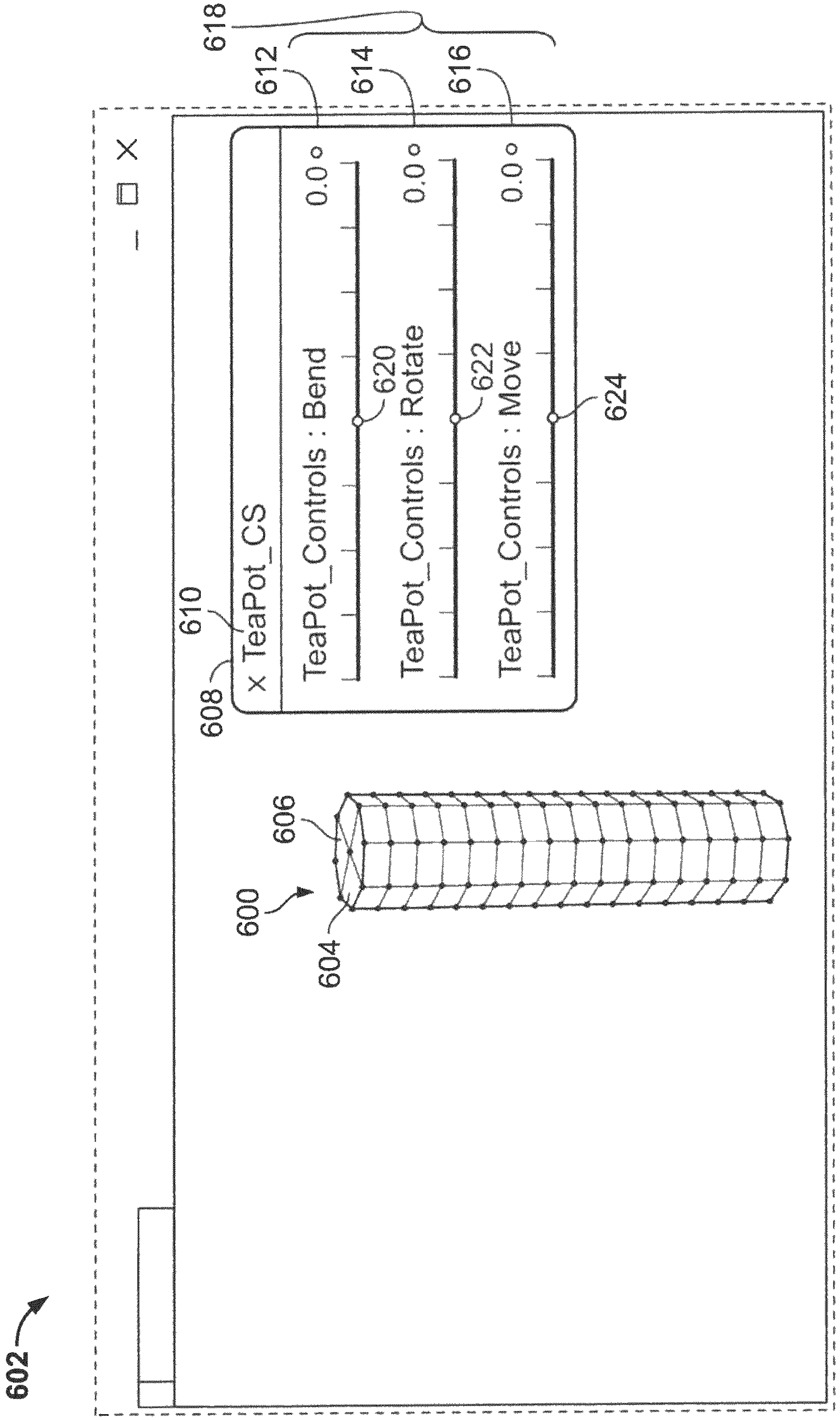
FIG. 6 is an illustration of an asset developed usmg the deformation engine system shown in FIG. 1 and FIG. 2.
Figure 7:
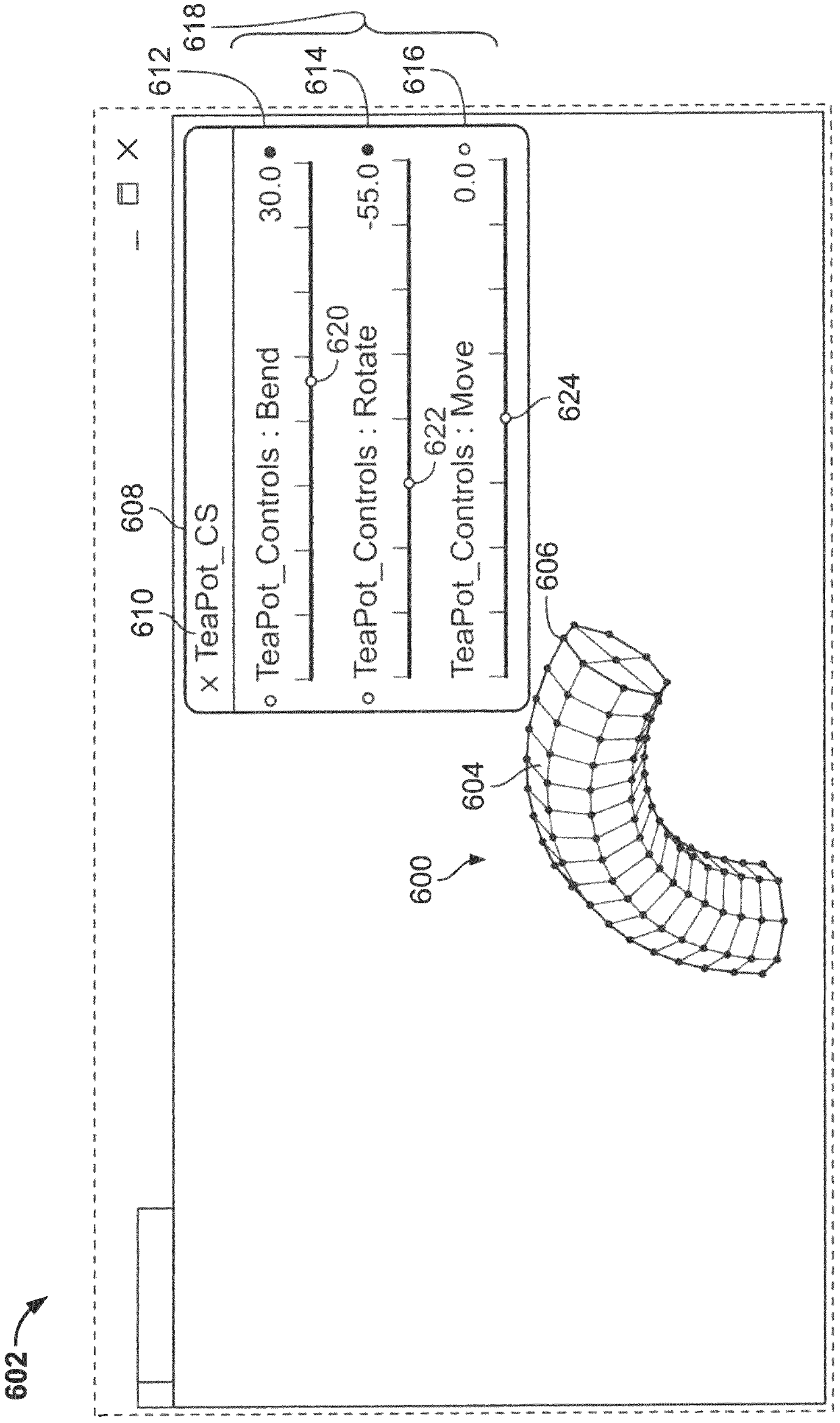
FIG. 7 is an illustration of the asset shown in FIG. 6, in which the order of operations specified by a developer controls the animation of the asset.

FIG. 6 is an illustration of an asset 600 created and edited using the deformation engine system 104 (shown in FIG. 1 and FIG. 2). FIG. 7 is an illustration of the asset 600 shown in FIG. 6, in which an order of operations is specified. In some embodiments, as described herein, an asset, such as asset 600, may be created using deformation engine system 104 in association with animation tool 202 and/or creation tool 204, where for example, deformation engine system 104 functions as a plugin to (or software extension of) an animation tool 202 and/or creation tool 204, at least in some cases, provided by a skin and bones game engine system 102.

As used herein, animation tool 202 and/or creation tool 204 may for simplicity be referred to as an "editor" or "GUI editor" 602, and in such cases, deformation engine system 104 may add functionality, as described herein, to the skin and bones GUI editor 602, such as specifying order of operations, layering, weighting, and many other options.

Accordingly, as shown, asset 600 may include a cylinder 604, although it will be appreciated that many other asset objects, shapes, and characters are contemplated by and within the scope of the present disclosure. Cylinder 604 is merely provided as an example shape. As described herein, one advantage of using deformation engine system 104 is that it may not be necessary to include an inner framework or "skeleton" of "bones" in asset 600, which would be the case with conventional skin and bones game engine systems, such as game engine system 102.

Rather, deformation engine system 104 may include asset 600 (which may be imported into deformation engine system 104, as described herein) in a format that includes an exterior mesh 606, but which excludes an internal skeleton or network of articulating bones. Stated another way, cylinder 604 includes mesh 606 but does not include any internal architecture, such as internal network of articulating bones.

In the example embodiment, GUI editor 602 may include one or more panes, editing windows, editors, and the like, such as for example, a deformers editor (not shown) and/or an order of operations or 000 editor 608. In at least some implementations, the deformers pane may include a plurality of deformers, each of which may be selectively associated with or applied to asset 600. Further, as described above, in some embodiments, deformers selected from the deformers pane may include pre-built deformers, such as those imported from other assets as well as custom deformers created, for example, using a custom deformers API provided with deformation engine system 104. As a result, although not shown, a user may select one or more deformers, such as from a drop-down list, in the deformers pane. In the example of FIG. 6 and FIG. 7, one such deformer 610, titled "TeaPot_CS" is selected. In response to selection of deformer 610, 000 editor 608 appears adjacent asset 600.

In the simple example of FIGS. 6 and 7, a plurality of deformer channels, such as first, second, and third deformer channels, 612-616, respectively, are displayed in 000 editor 608. Although deformer 610 includes three channels 612-616 in this example, it will be appreciated that a deformer, such as deformer 610, may include any number of channels, each of which may, as described herein, be used to control the deformation applied to a visual appearance of an asset, such as asset 600.

In 000 editor 608, the user may select one or more deformer channels 612-616 (e.g., by dragging using a mouse, a stylus, a touchscreen interface, and the like) to arrange the order in which each channel 612-616 appears in the deformer stack 618. Specifically, by arranging and rearranging the order of one or more channels 612-616 in stack 618, the user may graphically control the order of operations associated with channels 612-616. Specifically, in at least some embodiments, the order of channels 612-616 in stack 618 may specify the order in which each deformer 612-618 will be evaluated during a simulation of asset 600, such as during development in editor 602. Likewise, the order of stack 618 may specify the order of operations during execution of the game at the completion of game development, such as on a personal computer or game console.

By adjusting the order of operations, the user may achieve a wide variety of graphical effects. For example, where first channel 612 is a "bend" channel, second channel 614 is a "rotate" channel, and third channel 616 is a "move" channel, the user may, for example, drag the "bend" channel 612 down under the "rotate" channel 614 to cause asset to bend prior to rotating. On the other hand, if the bend channel 612 is not moved but remains, as shown, at the top of the stack 618, the asset will be deformed, during simulation or game execution, such that asset 600 is first bent as specified by bend channel 612 and then rotated as specified by rotate channel 614. A bend first and a rotate second are illustrated in FIG. 7, although it is not possible to see the rotation of asset 600 from the still image.

As a result, the visual or graphical effect achieved may be varied simply based on the arrangement or order of operations of each deformer channel in stack 618. It will be appreciated that this is a simple example of order of operations game development and that in many cases, a deformer may be selected with many more than three channels. Likewise, as described herein, many deformers may be applied to a given asset, such as asset 600, each specifying a respective order of operations, to achieve high-fidelity, beautiful, film-quality graphics.

In addition to these features, as shown, each channel 612-616 may be associated with a channel weight, which may be used to adjust the degree to which the respective channel 612-616 influences the appearance of asset 600. For example, first channel 612 is associated with a first weight 620, second channel is associated with a second weight 622, and third channel is associated with a third weight 624. In the example embodiment, each channel weight 620-624 may be adjusted left and right, such as using a slider, to adjust the degree to which the channel affects the asset 600. To illustrate, the weight 620 for bend channel 612 may be increased to decreased to bend asset 600 more or less to the left and/or right. Likewise, the weight 622 for rotate channel 614 may be adjusted left and right to control the speed of rotation of asset 600 clockwise and/or counterclockwise.

As a result, game deformation system 104 may not only facilitate order of operations features during game development, but intuitive, easy-to-use weightings for each deformer channel, to easily achieve a variety of true-to-life deformations without the necessity, as described herein, of manipulating a plurality of interconnected bones or joints in a traditional skin and bones system. Rather, each deformer channel 612-616 may be simulated and/or evaluated independently of every other deformer channel 612-616, such that evaluation of any given deformer channel 612-616 does not impact or cascade into the evaluation of another deformer channel 612-616. The same is true, at the next level up, for deformers, which again, may each include a plurality of deformer channels.

Example Input File Consistency and Portability

In some embodiments, leveraging the portability and consistency capabilities of the input file format, as described herein, the developer may begin their rig, weight map, and fitting authoring in one DCC (e.g. MODO), continue their rig, weight map, and fitting authoring in another DCC (e.g. MAYA), capture and save live-action animations or "clips" in another DCC (e.g. UNREAL ENGINE), open and refine those clips in another DCC (e.g. MAYA again), and finally save and load those clips and rig data in an end-user experience built in another DCC (such as UNITY or UNREAL ENGINE). In all steps along the way, the deformation system and rig file format ensure identical on-screen performance regardless of DCC differences or hardware platform differences.

Example Weight Maps and Layering Using the Deformation Engine System

Figure 8:
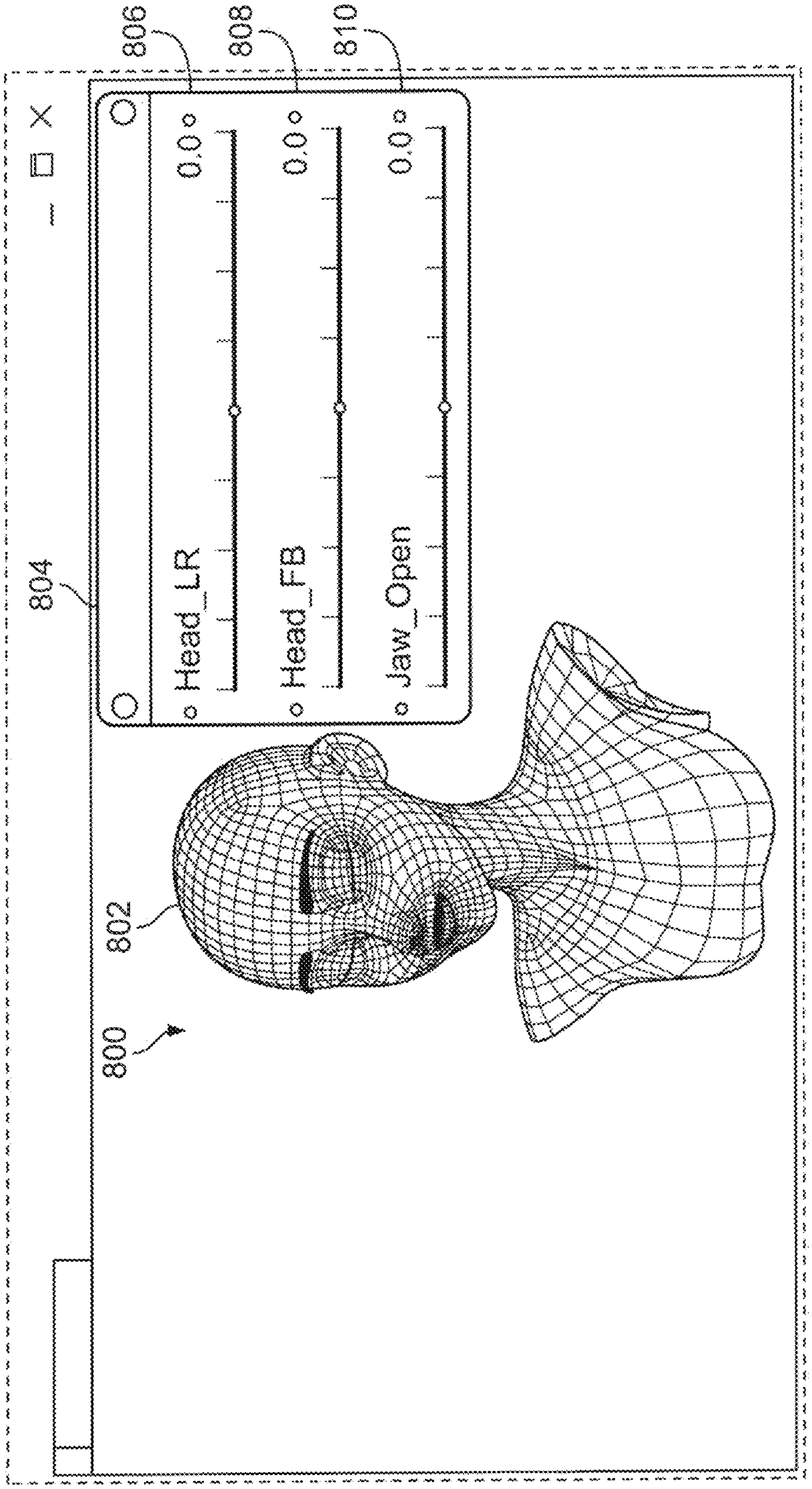
FIG. 8 is an illustration of a partial character developed using the deformation engine system shown in FIG. 1 and FIG. 2.

FIG. 8 is an illustration of a partial character asset 800 created and edited using deformation engine system 104 (shown in FIG. 1 and FIG. 2). In the example embodiment, asset 800 includes a mesh 802 and, as described herein, excludes an internal framework or internal articulating skeletal structure. Rather, deformations are applied to asset 800, as described herein, using only a plurality of layered deformers, each including a plurality of deformation channels evaluated according to an order of operations specified by a game developer during construction of asset 800.

Accordingly, in the example embodiment, an 000 editor pane 804 (as described above) is provided adjacent asset 800, such as in response to selection of one or more deformers. In general, and to illustrate briefly, a "Head_LR" channel 806 may be used (by adjusting weightings on the associated slider) to move the asset's head left and right. Likewise, a "Head_FB" channel 808 may be used to adjust the head of asset 600 back and forth, again using the associated slider. In addition, a "Jaw_Open" channel 810 may be used in the same way to open and close the jaw of asset 600. As a result, as described herein, in at least some embodiments, deforming an asset, such as asset 800, may include, for example, altering the view and/or geometry of an asset 800 from a first position or geometry to a second, different, position or geometry, showing the transformation of the asset between the first position or geometry and the second position or geometry, and the like.

Figure 9:
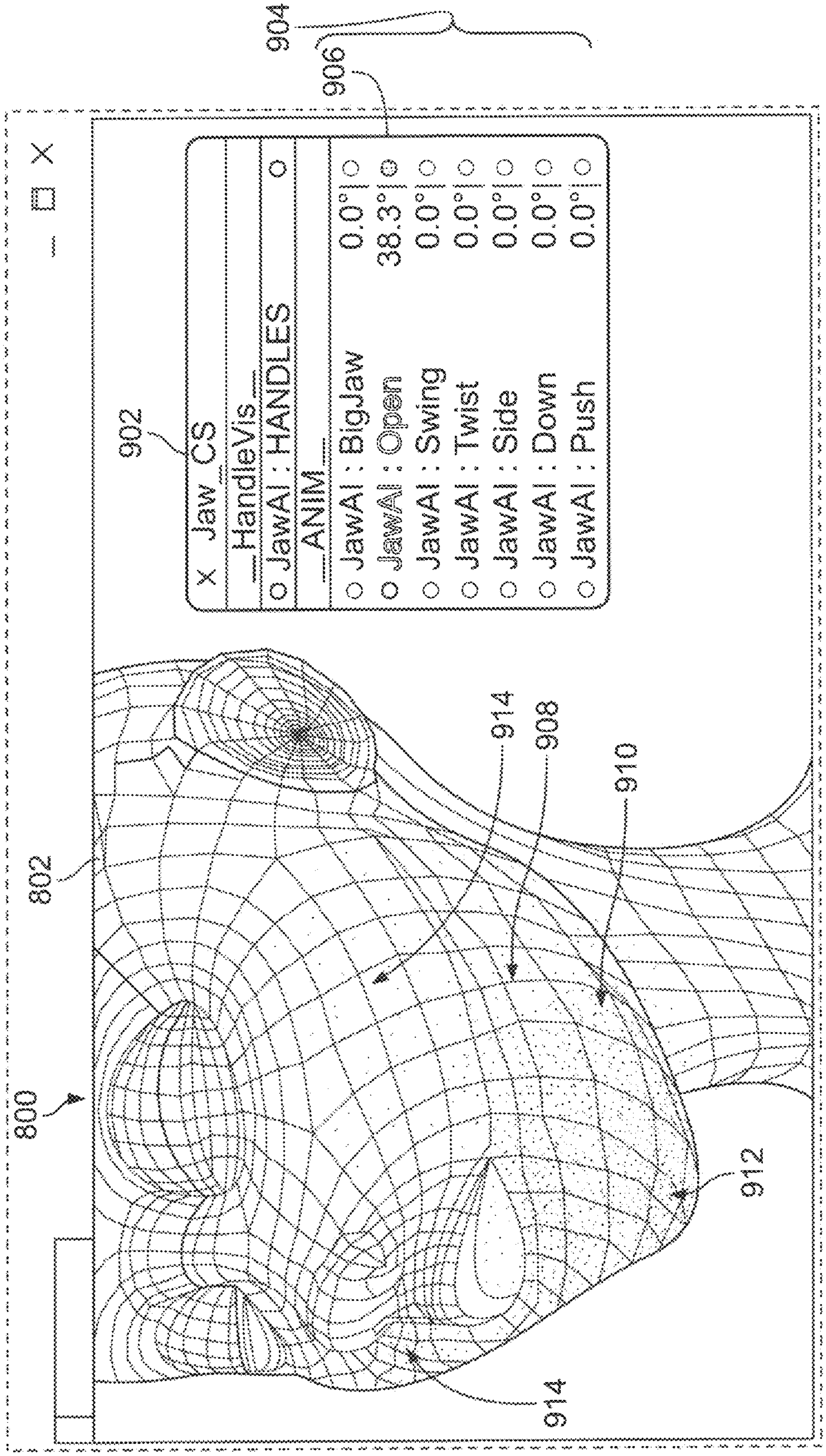
FIG. 9 is an illustration of the partial character shown in FIG. 8, in which a first weight map associated with a first deformation channel is shown.

In the example embodiment, and as shown with reference to FIG. 9, assets, such as asset 800, may also be associated with one or more weight maps. Moreover, as described herein, weight maps may be associated with respective deformer channels, layered one atop the other, and evaluated according to an order of operations specified in association with the plurality of deformer channels. As shown, in at least some embodiments, higher dot or stippling densities may generally indicate higher weight values, while lower or absent dot or stippling densities may indicate lower or zero weight values.

To illustrate, in the example embodiment, a deformer 902 titled "Jaw_CS" may be selected and displayed adjacent asset 800. Deformer 902 may include a stack 904 of channels such as channel 906 responsible for opening and closing the jaw of asset 800. Stack 904 may be ordered and re-ordered, as described herein, according to user preferences. Each channel in stack 904 also includes a slider that may be used to adjust a weight associated therewith.

In addition to providing an adjustable weighting in association with each channel in stack 904, in at least some embodiments, a weight map may be provided for each weighted channel in stack 904 and displayed in association with asset 900 to provide for simplified graphical development. For example, as shown in FIG. 9, a weight map 908 may be shown over mesh 802 to illustrate the impact that adjustment of the weighting associated with the jaw open channel 906 will have on an area or domain 910 impacted or affected by weight map 908 for channel 906.

For example, in the illustrated example, domain 910 of weight map 908 extends over much of the cheek and chin area of asset 800 but does not extend to include the forehead or brow. In addition, weight map 908 is heavier in portions of domain 910 to indicate portions that will be more impacted, or more deformed, by adjusting the channel weighting for the jaw open channel 906. In the example of FIG. 9, the chin region 912 under the mouth of the asset 800 is included in domain 910 and shaded more heavily than the cheeks regions 914, which are also included in domain 910. As a result, adjusting the weighting associated with jaw open channel 906 will result in greater deformation when the mouth moves in chin region 912 than in cheeks region 914.

Moreover, as can be seen weight map 908 is shaded continuously over domain 910 and blends from heavier shading in chin region 912 to cheeks region 914. As a result, the deformation of domain 910 when the jaw of asset 800 opens and closes is also smoothly blended over the surface of mesh 802, resulting in a smooth deformation or transformation of the mesh 802 or mesh surface rather than, as in prior skin and bones systems, a stepwise transformation of discrete bone-vertices under the mesh surface.

Figure 10:
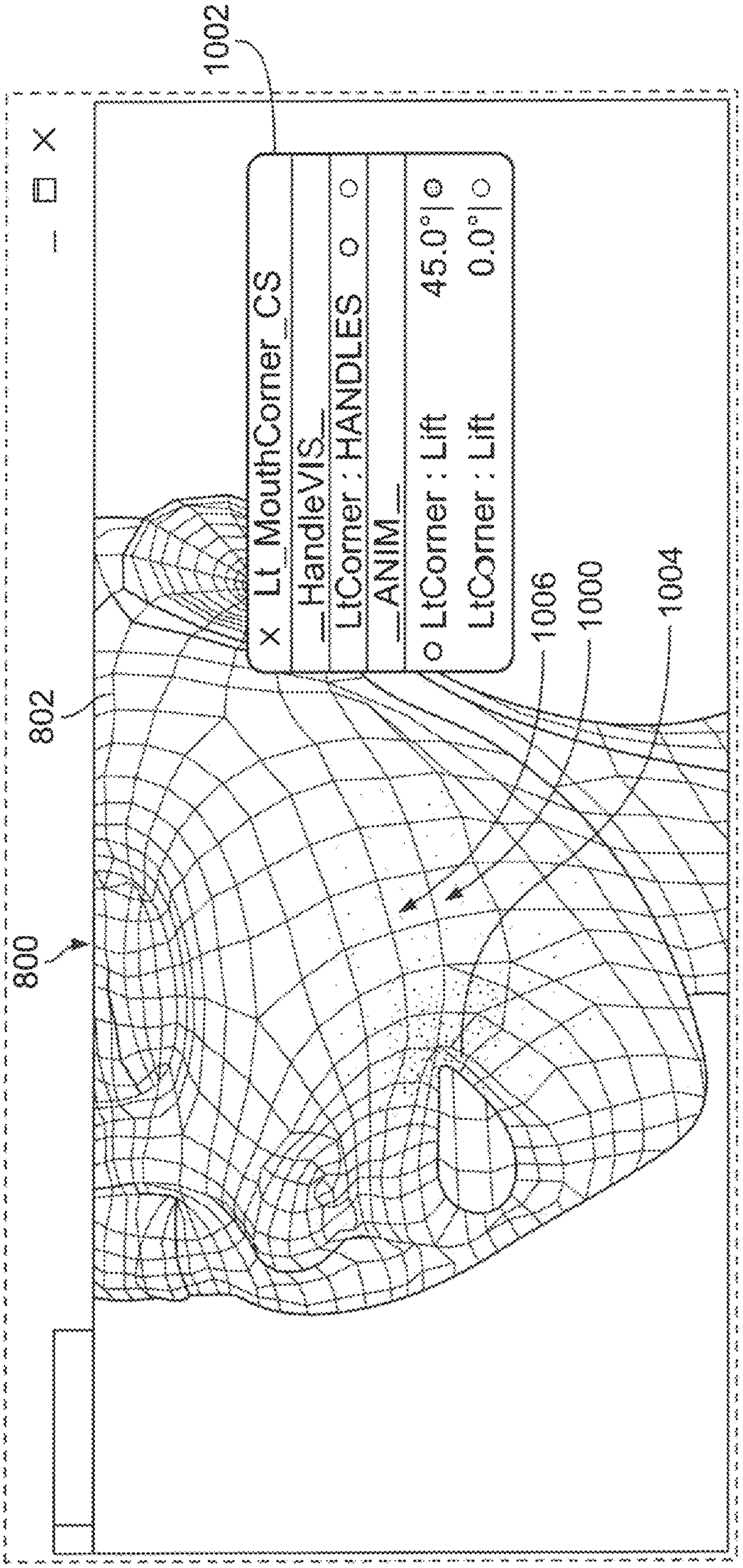
FIG. 10 is an illustration of the partial character shown in FIG. 9, in which a second weight map associated with a second deformation channel is shown.

FIG. 10 is an illustration of the partial asset 800 (shown in FIG. 9), in which a weight map 1000 associated with a deformation channel 1002 is shown. More particularly, the deformation channel 1002 is associated with a "left mouth corner lift" deformation of asset 800, where for example, as the weighting associated with channel 1002 is adjusted, the upward deformation, or upward lift, of the left mouth corner 1004 either increases or decreases.

In the example embodiment, weight map 1000 illustrates the impact that adjustment of the weighting associated with channel 1002 will have on an area or domain 1006 impacted or affected by weight map 1000 for channel 1002. For example, domain 1006 of weight map 1000 extends over much of the cheek area of asset 800 but does not extend to include the forehead or brow. In addition, weight map 1000 is heavier in portions of domain 1006 to indicate portions that will be more impacted, or more deformed, by adjusting the channel weighting for "left mouth corner lift" channel 1002.

In addition to enabling weight maps, such as weight map 908 and 1000, deformation engine system 104 may also facilitate layering a plurality of weight maps create, for example, complex, high-fidelity, beautifully rendered, facial expressions and other asset motion and deformations. For example, with combined reference to FIG. 9 and FIG. 10, a developer may specify that weight map 908 and weight map 1000 should be layered or combined on asset 800 to achieve a combined "jaw open" and "left mouth corner lift" deformation. The weight maps 908 and 1000 may independently control these facial expressions as well as the impact that the associated deformations have in their respective domains 910 and 1006, such that the total deformation achieved is different from the deformation that either of the weight maps 908 and 1000 would achieve acting alone.

Moreover, although only two weight maps 908 and 1000 are illustrated here, it will be appreciated that any suitable number of weight maps may be added to an asset 800. Notwithstanding, however, in many scenarios, the flexibility and robust deformation properties afforded by individual deformations, and their accompanying weight maps, may be adequate to achieve a desired overall deformation using only a few deformations and weight maps. Stated another way, although any number of deformations and/or weight maps may be applied to an asset, in many cases, these techniques are so robust that an additional technical improvement may be achieved in that a limited number of deformations and/or weight maps may be used.

In addition, in at least some embodiments, deformation engine system 104 may enable a user, such as a game developer, to turn one or more layers on and/or off to "mute" one or more deformations associated with the rigging of asset 800. This muting feature may, for example, give execution budget back to a processor, such as processor 110 to facilitate more rapid game execution. On the other hand, where muting is turned off or more limited, more detailed deformations may be enabled. As a result, deformation engine system 104 provides an array of options for independently customizing and tuning an asset rig, including deformations, weightings, layers, and the like, to achieve a desired balance of execution time, graphics quality, and the like. Moreover, LOD systems discussed earlier may manage muting or unmuting deformations automatically accordingly to user-configured policies of desired fidelity and/or performance.

Example Animated Weights Using the Deformation Engine System

Figure 11:
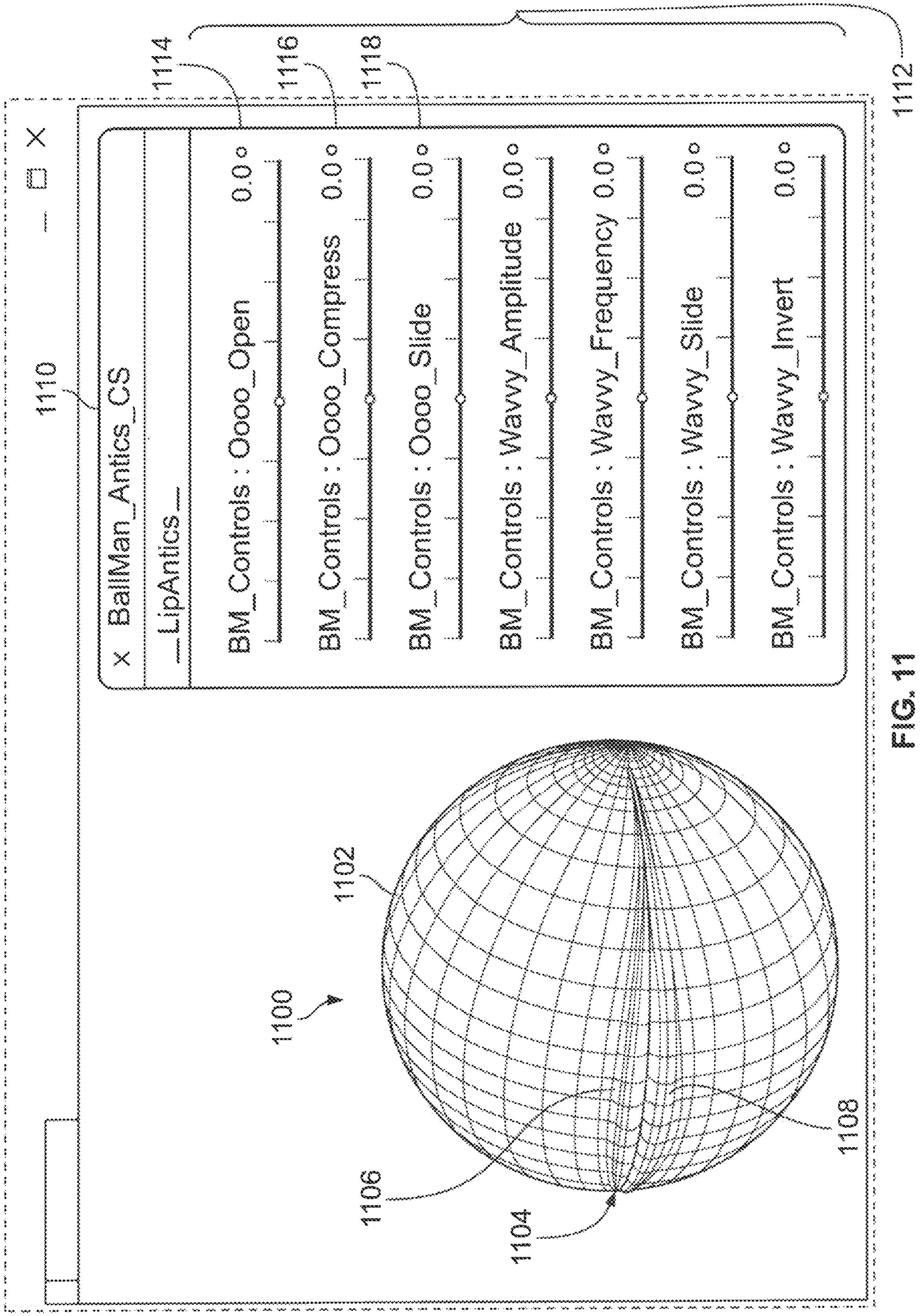
FIG. 11 is an illustration of an asset created and edited using the deformation engine system shown in FIG. 1 and FIG. 2, including a plurality of orderable deformation channels are shown adjacent the asset.
Figure 12:
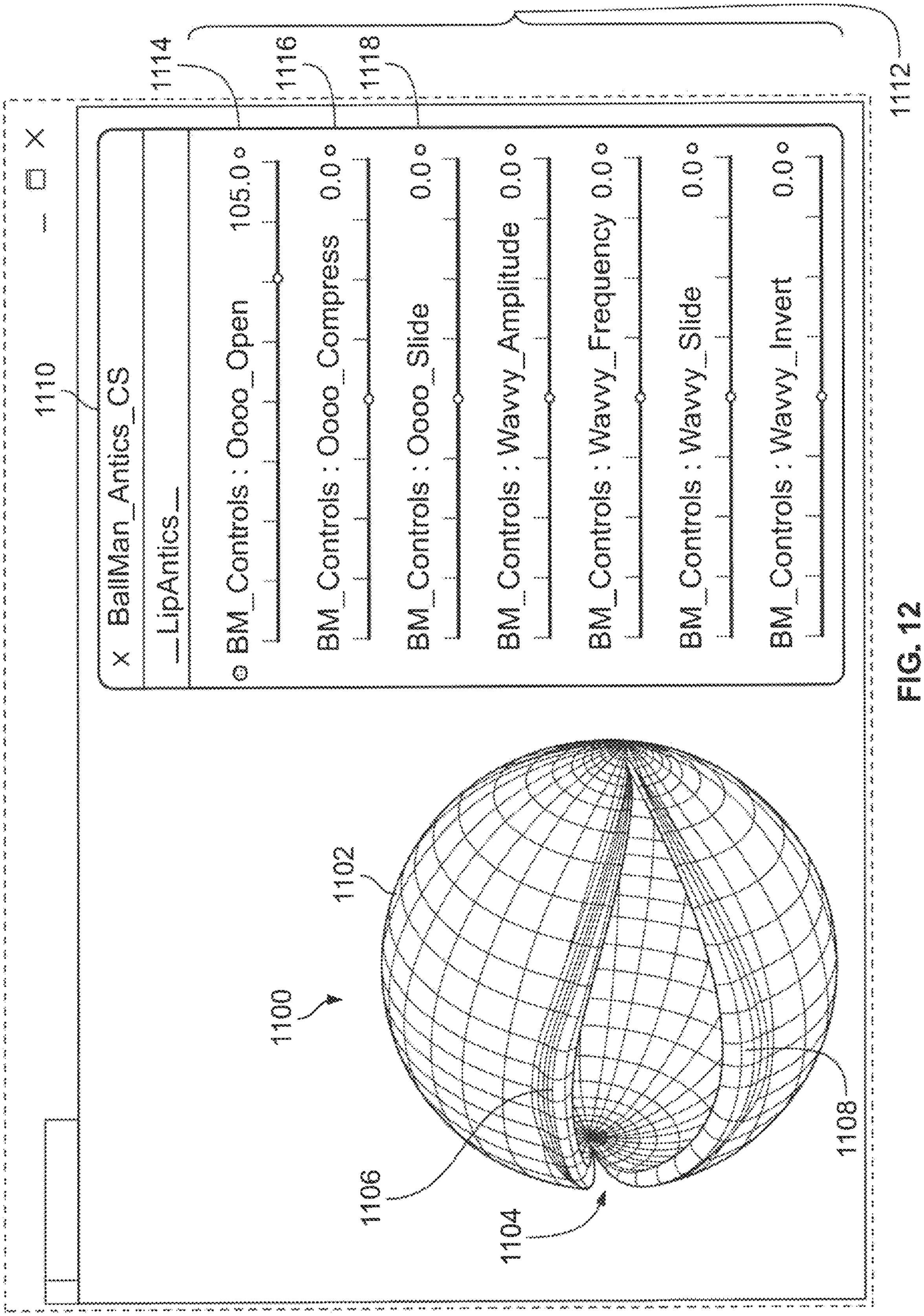
FIG. 12 is an illustration of the asset shown in FIG. 11, in which one deformation channel is adjusted to affect a corresponding graphical adjustment of the asset.
Figure 13:
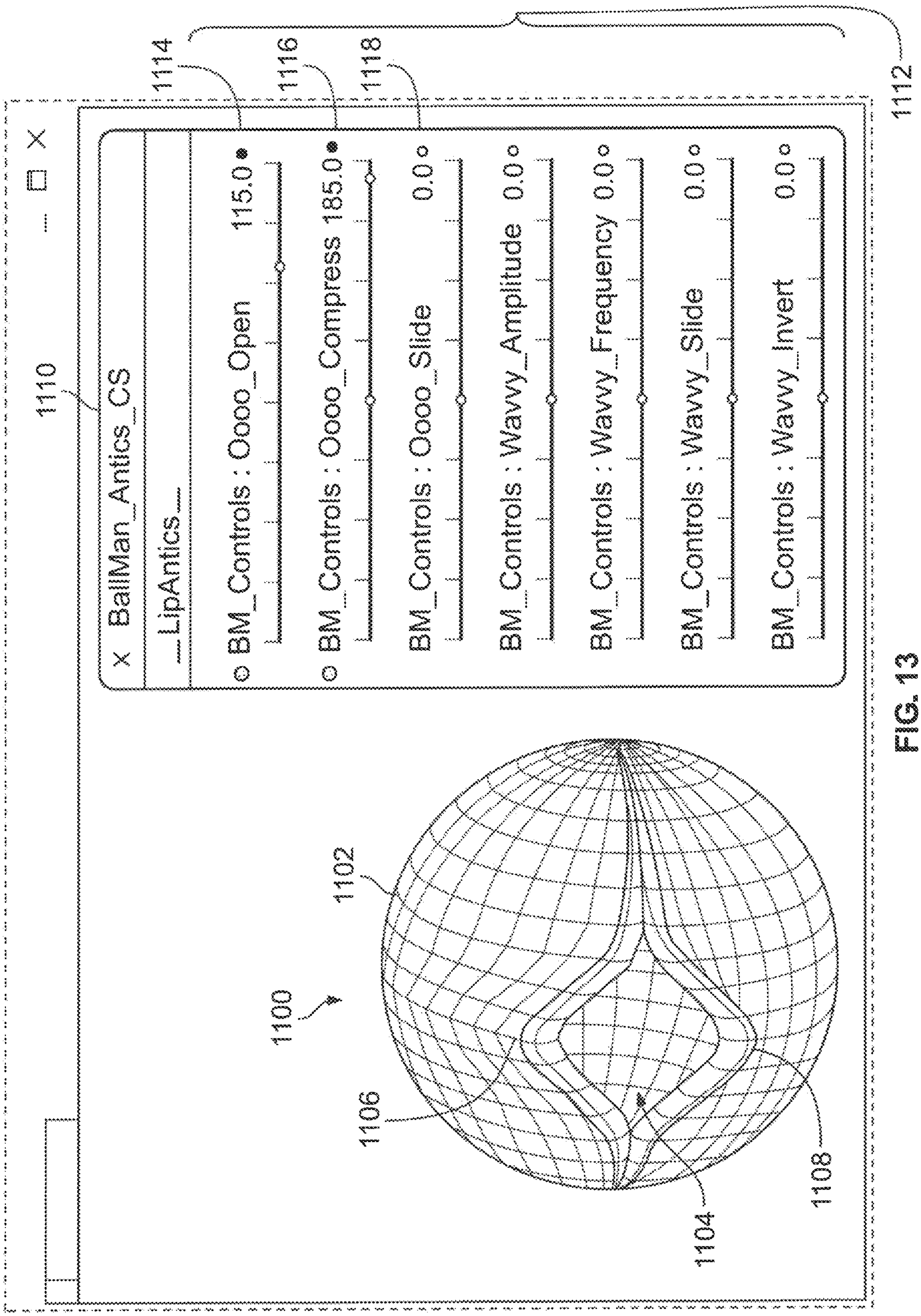
FIG. 13 is an illustration of the asset shown in FIG. 11 and FIG. 12, in which two deformation channels are adjusted to affect several corresponding graphical adjustments of the asset.
Figure 14:
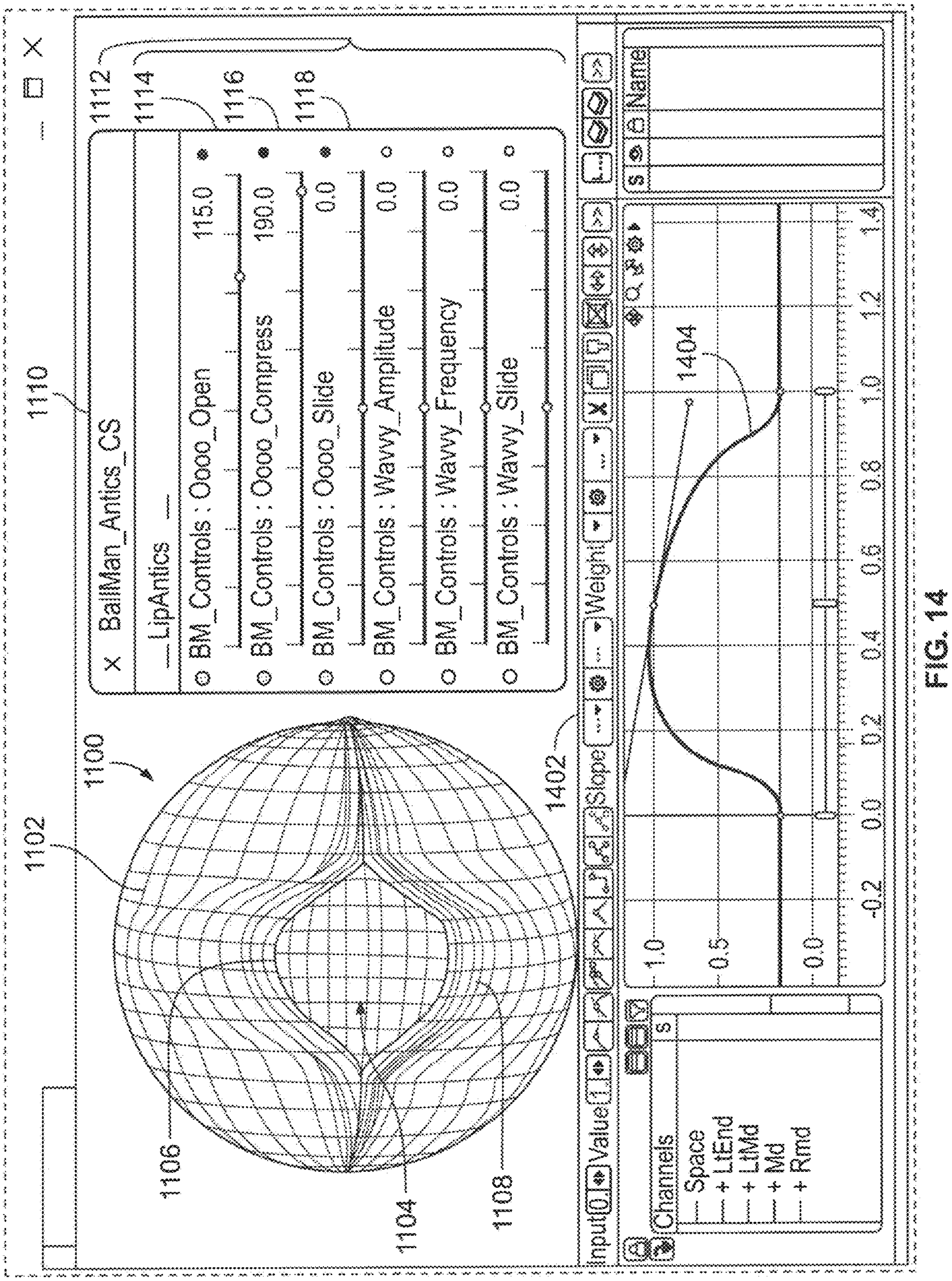
FIG. 14 is an illustration of the asset shown in FIGS. 11-13, in which a deformer channel editor is shown and may be used to adjust an animated weight of the respective deformer channel.

FIG. 11 is an illustration of an asset 1100 developed usmg deformation engine system 104 (shown in FIG. 1 and FIG. 2) including a plurality of orderable deformation channels are shown adjacent the object. FIG. 12 is an illustration of the asset shown in FIG. 11, in which one deformation channel is adjusted to affect a corresponding graphical adjustment of the asset. FIG. 13 is an illustration of the asset shown in FIG. 11 and FIG. 12, in which two deformation channels are adjusted to affect several corresponding graphical adjustments of the asset. FIG. 14 is an illustration of the asset shown in FIGS. 11-13, in which a deformer channel editor is shown and may be used to adjust an animated weight of the respective deformer channel.

Accordingly, with combined reference to FIG. 11 through FIG. 14, asset 1100 includes a mesh 1102, as described herein, and excludes an internal skeletal framework. Further, as described herein, in some embodiments, asset 1100 may be imported into game engine system 104 in a naked format that excludes rigging (e.g., deformations), such as using an input file. In some implementations, the naked asset 1100 may also be created using deformation engine system 104.

In the example embodiment, mesh 1102 defines a generally spherical object that includes a mouth 1104 having an upper lip 1106 and a lower lip 1108. An 000 editor 1110 is shown adjacent asset 1100 and includes a plurality of channels 1112, each of which may be used, as described herein, to control a deformation aspect of asset 1100. For example, an "open" channel 1114 may cause mouth 1104 to open and close. Likewise, a "compress channel" 1116 may cause mouth to compress and decompress, a "slide" channel 1118 may slide mouth 1104 left and right on asset 1100, and so on. Accordingly, as shown with reference to FIG. 12, adjustment of open channel 1114 causes mouth 1104 to open. The degree to which mouth 1104 is deformed to open may be adjusted, as shown, using the slider associated with open channel 1114. Similarly, as shown with reference to FIG. 13, the degree to which mouth 1104 is deformed to compress may be adjusted using the slider associated with compress channel 1116.

With reference to FIG. 14, and in the example embodiment, a deformer channel editor 1402 may be displayed and used by a game developer or artist to customize a deformer channel property, such as a shape of the deformation produced by the channel. In various embodiments, these customized channel shapes or channel properties may be referred to as "animated deformations."

In the illustration of FIG. 14, deformer channel editor 1402 displays a curve 1404 associated with a shape of open channel 1114. Moreover, as shown, curve 1404 may be edited and/or fine-tuned in the editor 1402 to affect a corresponding change in the shape of mouth 1104. Specifically, the shape of curve 1404 corresponds, in the example embodiment to the shape of upper lip 1106 as well as the shape of lower lip 1108, where upper lip 1106 is symmetric with lower lip 1108 about a horizontal axis of symmetry (namely, the centerline of mouth 1104). As a result, changing the shape of curve in editor 1402 causes the shape of mouth 1104 to change, as can be seen in FIG. 14.

Accordingly, deformer channels may not only be associated with individual weightings and/or weight maps, as described herein, but in at least some embodiments, deformer channels may be independently tuned, such as using a channel editor 1402, to adjust a shape of the deformation produced or affected by each deformer channel. The range of deformation shapes that can be achieved using an almost endless variety of customizable animated deformations, which may, it will be appreciated contribute further to the realism and flexibility associated with the computer animation techniques and systems described herein.

Example Shape Correction Using the Deformation Engine System

Figure 16:
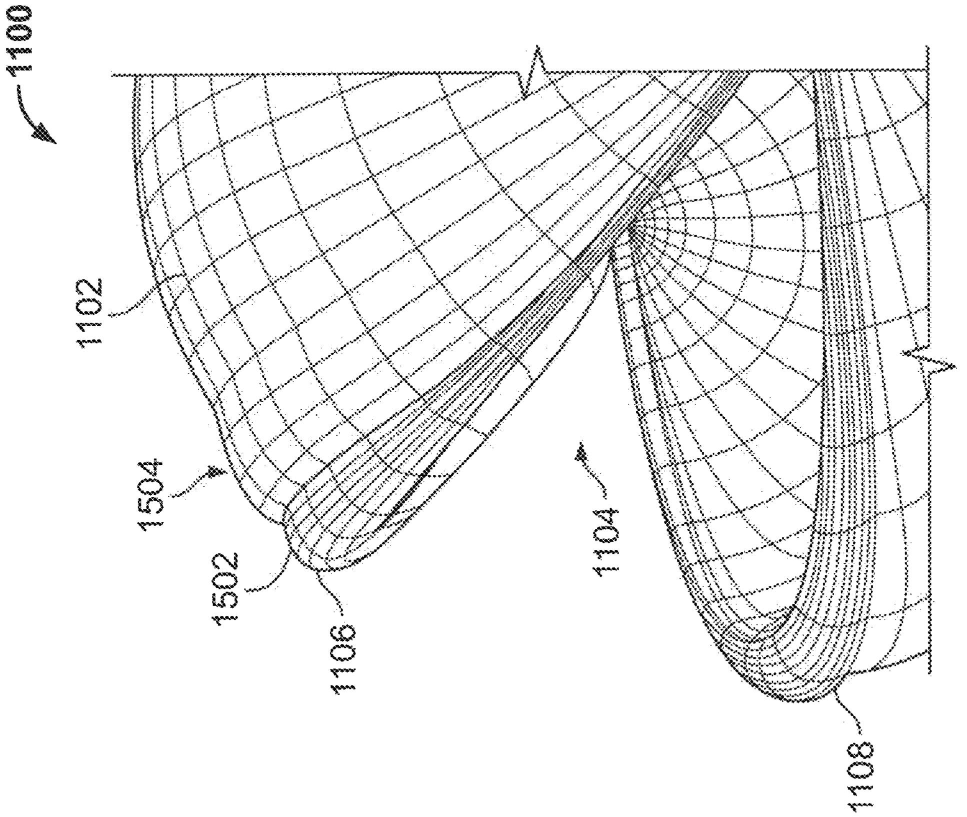
FIG. 16 is another illustration of the asset shown in FIGS. 11-14, m which the shape correction associated with the adjusted deformation channel is automatically adjusted in response to adjustment of the deformation channel.
Figure 15:
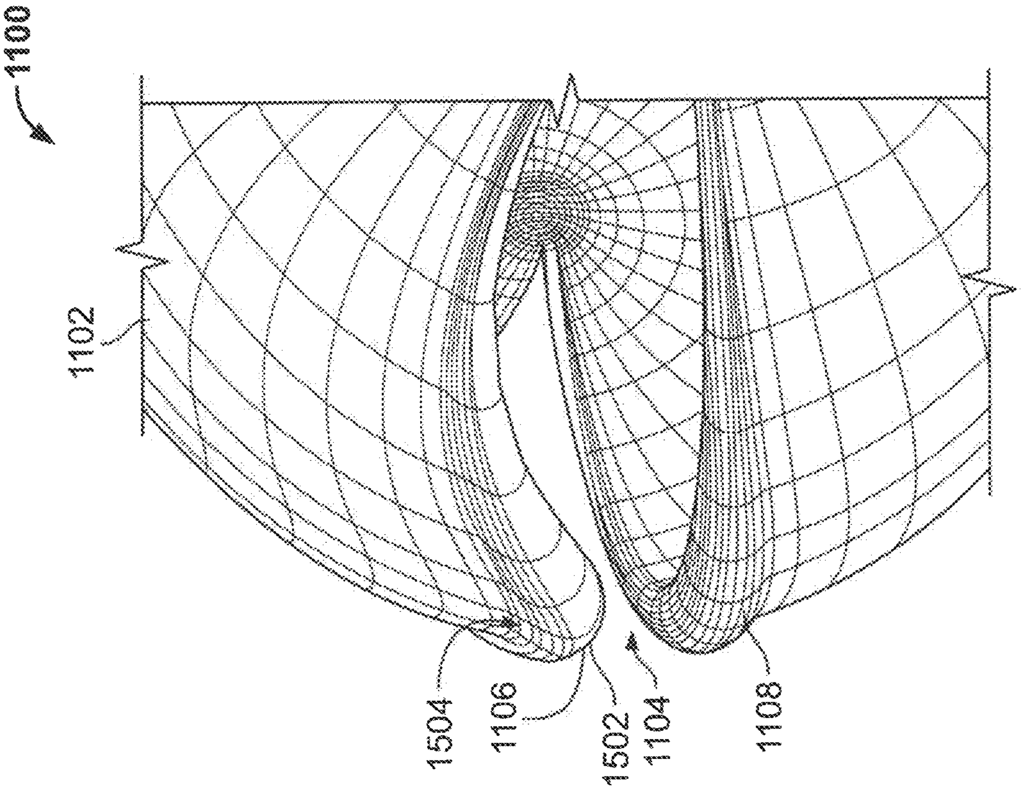
FIG. 15 is an illustration of the asset shown in FIGS. 11-14, in which a shape correction associated with an adjusted deformation channel is automatically adjusted in response to adjustment of the deformation channel.

FIG. 15 is an illustration of asset 1100 (shown in FIGS. 11-14), in which a shape correction associated with an adjusted deformation channel is automatically adjusted in response to adjustment of the deformation channel. FIG. 16 is another illustration of the asset 1100, in which the shape correction associated with the adjusted deformation channel is automatically adjusted in response to adjustment of the deformation channel.

Accordingly, with reference to FIG. 15, mouth 1104 of asset 110 is shown. More particularly, as shown, upper lip 1106 and lower lip 1108 are illustrated. As shown, one or more channels 1112 have been adjusted to create the illustrated deformation of mouth 1104, which as can be seen, includes a curved portion 1502 of upper lip 1106 that is pursed or projecting toward lower lip 1108. In the example embodiment, a domain 1504 near the curved portion 1502 is stretched or relatively un-bunched to create a life-like deformation in domain 1504 representative of mesh 1102 being pulled tight or stretched when upper lip 1106 includes curved portion 1502.

In contrast, as shown with reference to FIG. 16, when one or more channels 1112 (e.g., open channel 1114) are adjusted to open mouth 1104 wider, curved portion 1502 is pulled back or lifted and domain 1504 near curved portion 1502 is bunched or collected to create a life-like deformation in domain 1504 representative of mesh 1102 being bunched or collected near upper lip 1106.

These deformations are achieved using deformation engine system 104 without the aid of bones or joints, as would typically be required by a conventional skin and bones system. Likewise, the deformations shown in FIGS. 14 and 15 are possible without the use of blend shapes, which may be used in conventional skin and bones systems to create the illusion that one shape changes or morphs into another. Rather, as mouth 1104 is deformed, deformation engine system 104 automatically and dynamically adjusts the domain 1504 to account for the deformation of upper lip 1106.

Example Poses, Rig Reuse, and Mesh Editing

In various embodiments, and as described herein, deformation engine system 104 may facilitate creation of a variety of poses, where a pose may include a collection of deformer channels (and associated channel weightings, etc.) for subsequent reuse or recycling. To illustrate, example poses include, but are not limited to, “happy,” “snarl,” etc., where a “happy” pose may include channel weightings preset to create a happy asset expression (e.g., a happy face), a “snarl” pose may include channel weightings preset to create a snarling or unhappy asset expression, and the like. As a result, poses may embody preset or predefined “rigs,” which can be quickly recycled to impart various expressions and/or other geometries to blank or otherwise blank assets.

In the example embodiment, to facilitate more rapid and convenient game development, deformation engine system 104 may allow a game developer to save and recycle a collection of deformations, including the various weights, weight maps, layers, animated deformations and the like, as described herein, as a pose file or rig file or combinations thereof. The rig file may contain pre-set channel values, restorable to the original character asset or different character assets (with some plurality of matching channel names). The rig file may include a unique combination of deformation values previously created for an asset, appliable to other assets with identical, derivative, or re-shrinkwrappable topologies.

To recycle a pose or rig file, a game developer may selectively apply the stored pose file to another asset, which may or may not be the same as the asset for which the pose was originally developed. To illustrate, a pose (e.g., a “happy”) pose may be developed for a female character. Subsequently, a game developer may wish to import or otherwise apply the pose to a different character, such as a male character.

To apply the pose to the subsequent character, deformation engine system may enable the game developer to select the rig file originally created for the female character for application to the subsequent character. In response to selection of the rig file, deformation engine system 104 may apply the various deformation values and/or deformation settings saved in the rig file to the subsequent character, even though the subsequent character includes a geometry that is different from the geometry of the original (female) character. Stated another way, in at least some embodiments, animations may be shared between two distinct characters by normalizing the range of values associated with deformers common to both characters, such that animations may be shared effectively between both characters using the normalized range of deformer values.

To illustrate, in at least one example, a puppy dog character asset with a “left eye open” deformer and a “right eye open” deformer may share animations with a kitten (or other animal) asset, such as using normalized channel value ranges, although the two animal characters may have different topologies. For example, the same two channels may be used for both character assets (e.g., “left eye open” and “right eye open”), even though, for example, the mesh topology of each character is different. Moreover, it may not be necessary that all channels be common between the two animal asset characters (e.g., the puppy and the kitten). Rather, for example, the kitten may have one or more “whiskers bend” channels, while the dog may not include such deformation channels. Deformation engine system 104 is sufficiently flexible and robust to allow for animation of the channels common to both character assets, such as the puppy and the kitten (e.g., the “right eye open” and “left eye open” channels), while allowing for other channels that are not shared between the assets (e.g., “whiskers bend”) to also be used.

In addition to these features, and following, for example, application of a stored pose or rig to a new asset or character, deformation engine system 104 may also facilitate adjustment or fine-tuning of deformation paths associated with a given asset, such as to correct for variations in the geometry of the asset or character receiving a stored pose as compared to the asset or character for which the pose was originally developed.

Figure 17:
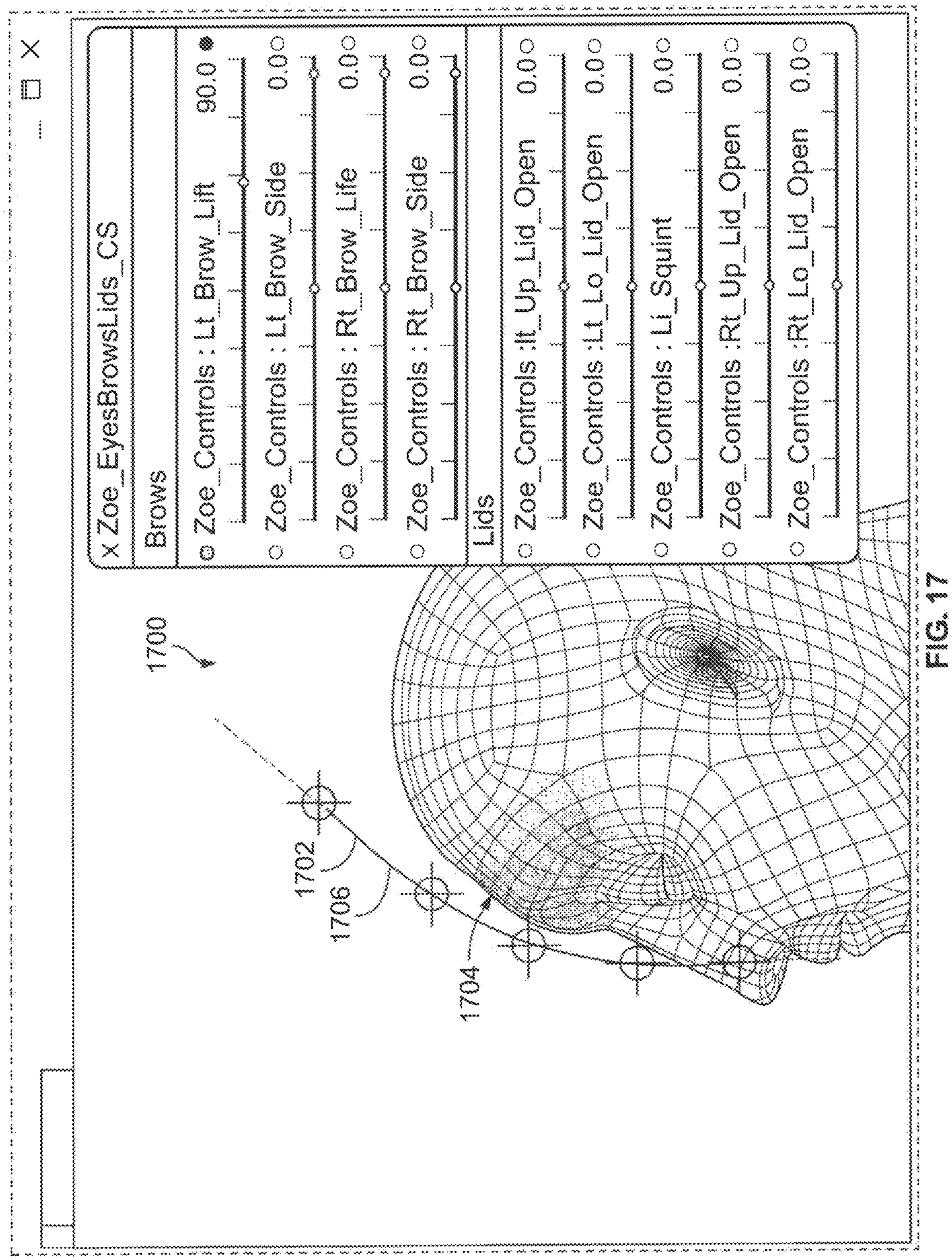
FIG. 17 is an illustration of a character created and edited using the deformation engine system shown in FIG. 1 and FIG. 2, in which a deformation path is visually adjusted using a deformation channel curve.

To illustrate, and with reference to FIG. 17, an asset 1700 is shown. In the example embodiment, a stored pose has been associated with asset 1700. In particular, asset 1700 is a male face, and the pose that has been associated with asset 1700 was originally created for a female face. As a result, a deformation path 1702 associated with a brow 1704 of asset 1700 may be higher or otherwise different from an optimal or desired deformation path of the male character.

To correct for the deformation path 1702 of the brow 1704 (again, previously developed for a female character), a deformation channel curve 1706 may be shown adjacent brow 1704 of asset 1700. A user or game developer may selectively adjust (e.g., using mouse, a touchscreen, etc.) deformation channel curve 1706 to bring deformation path 1702, for example, to a new position or orientation, which may be more suitable or natural for the deformation desired for a male character. This fine-tuning process may be applied to any of the deformations or deformation channels associated with a stored pose following application of the pose to a new asset to facilitate recycling of stored poses with the advantage and technical improvement that stored poses may also be quickly and easily adjusted to correspond to the new asset geometry, without having to recreate all of the rigging for a new asset from scratch. This pose recycling process may, for example, reduce rigging time for a given asset from several days to several hours.

Figure 18A:
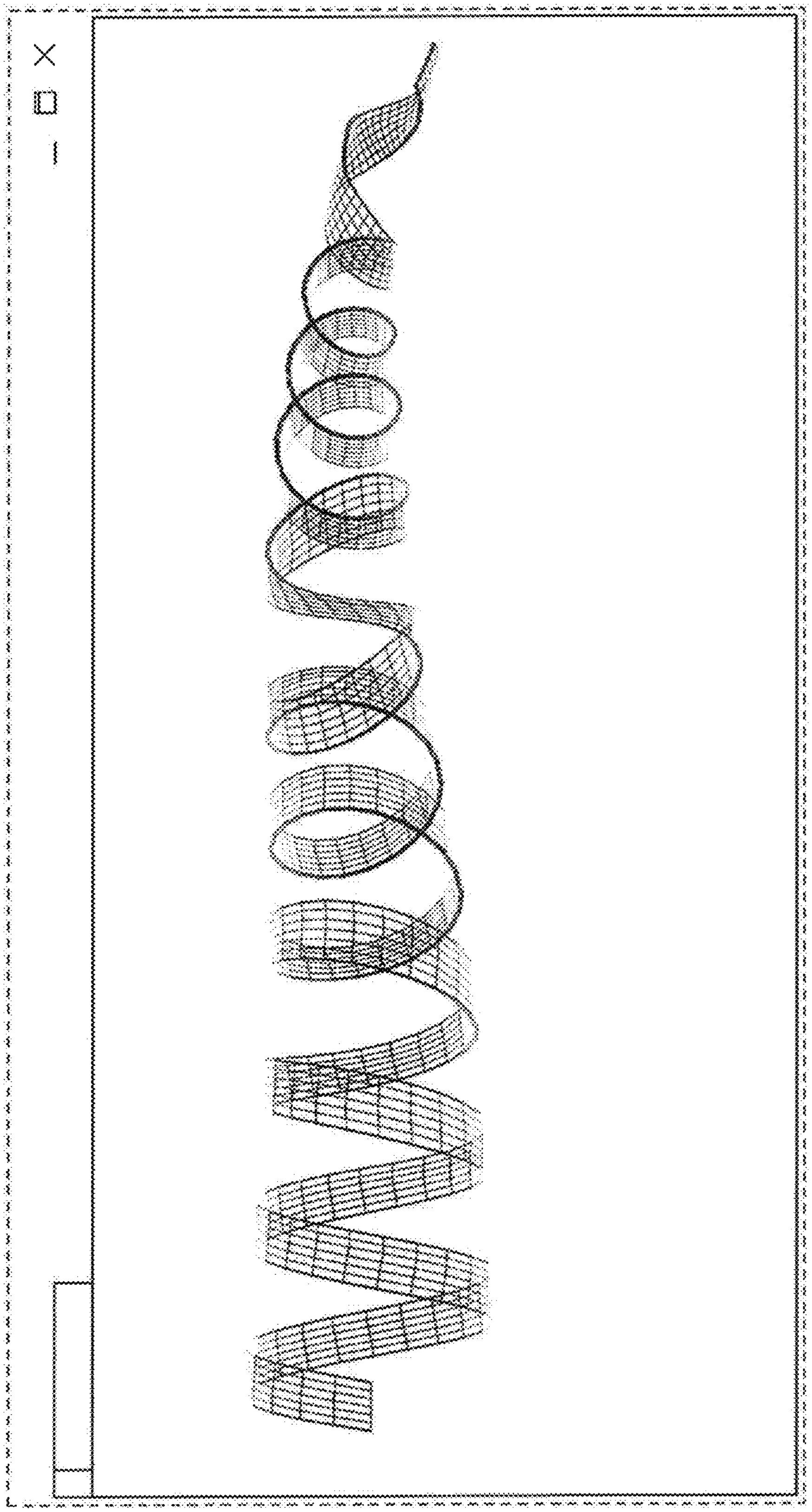
FIGS. 18A-D illustrate an additional example embodiment of a deformable asset and corresponding deformation values.
Figure 18B:
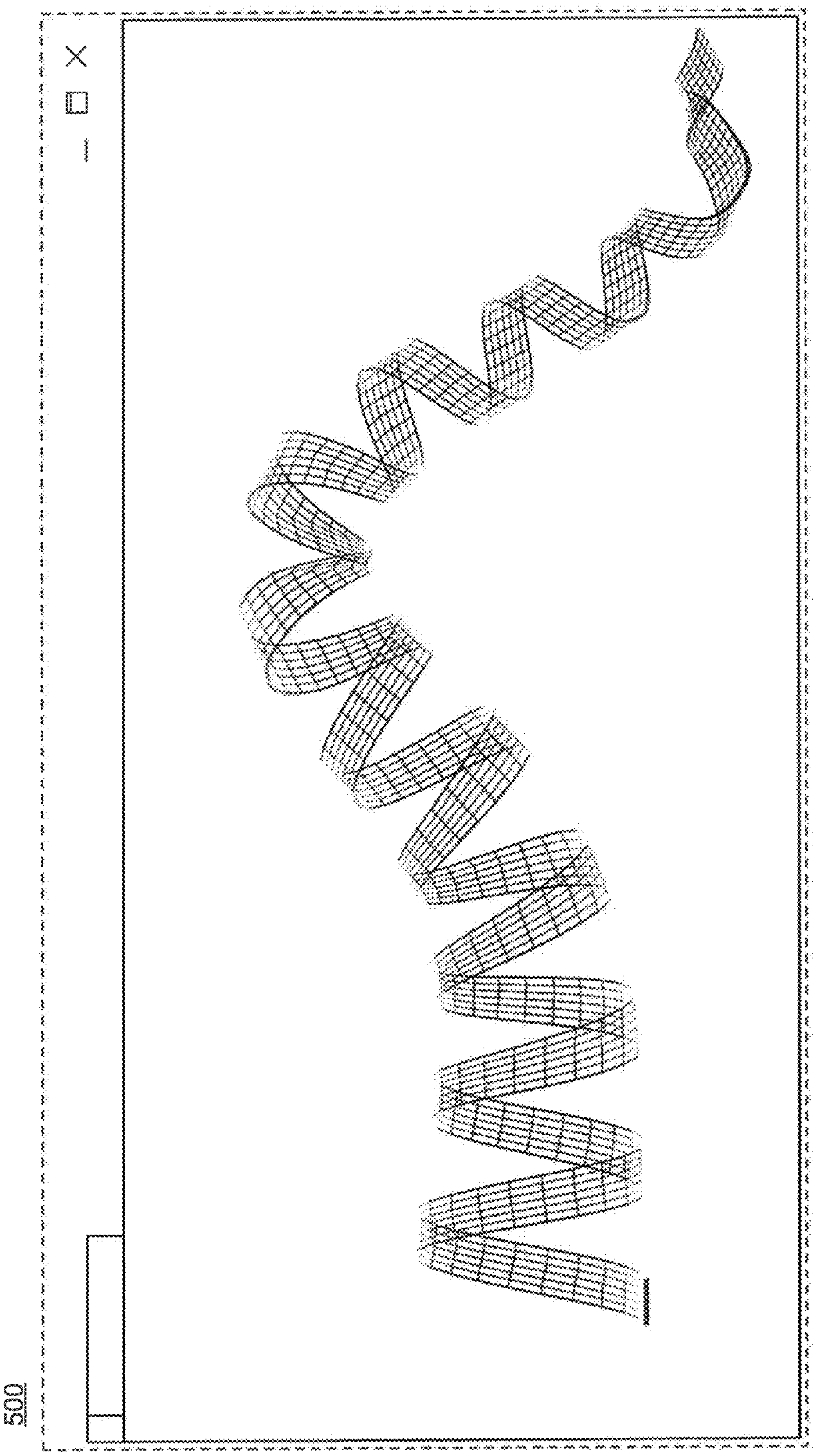
Figure 18C:
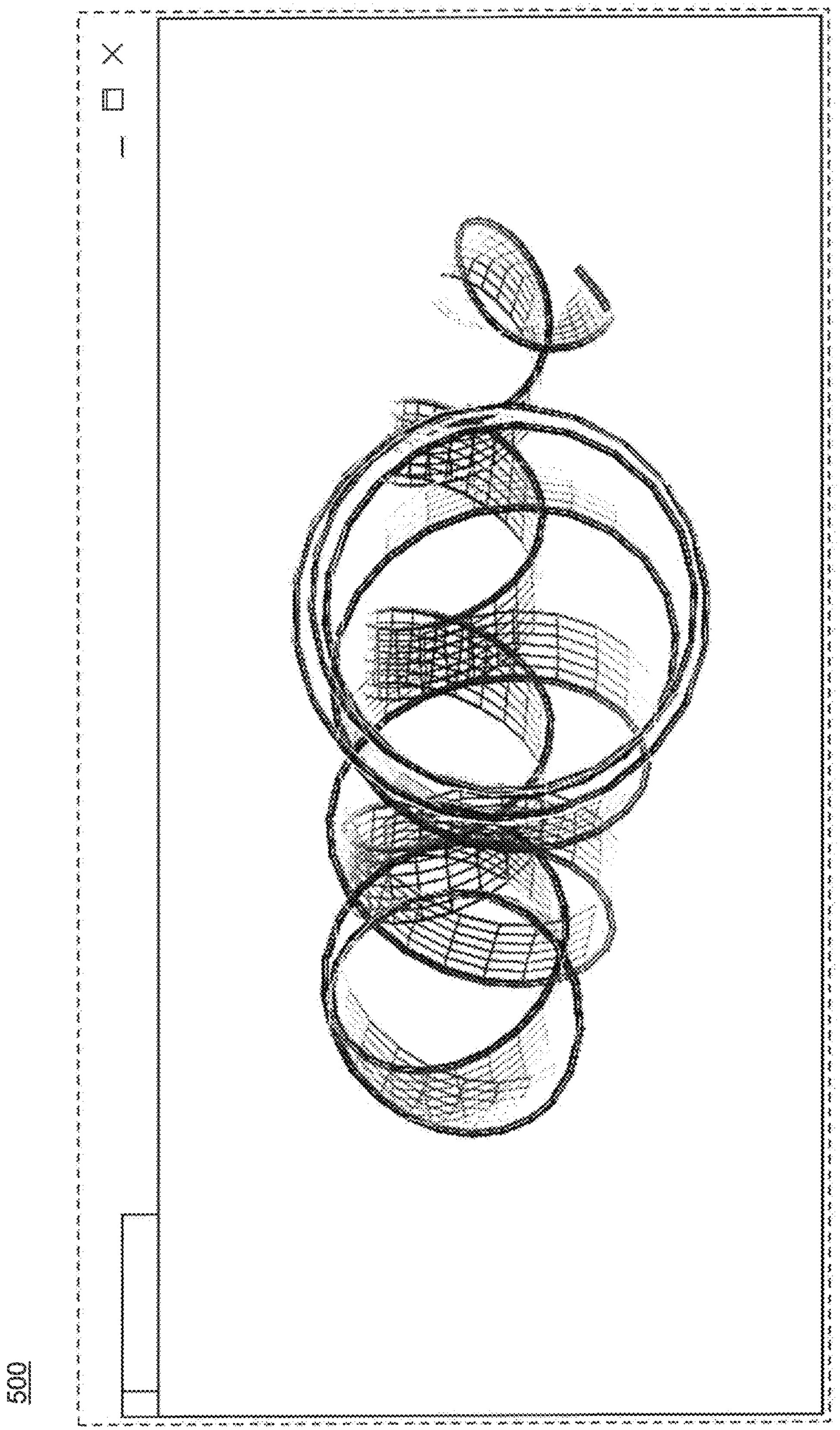
Figure 18D:
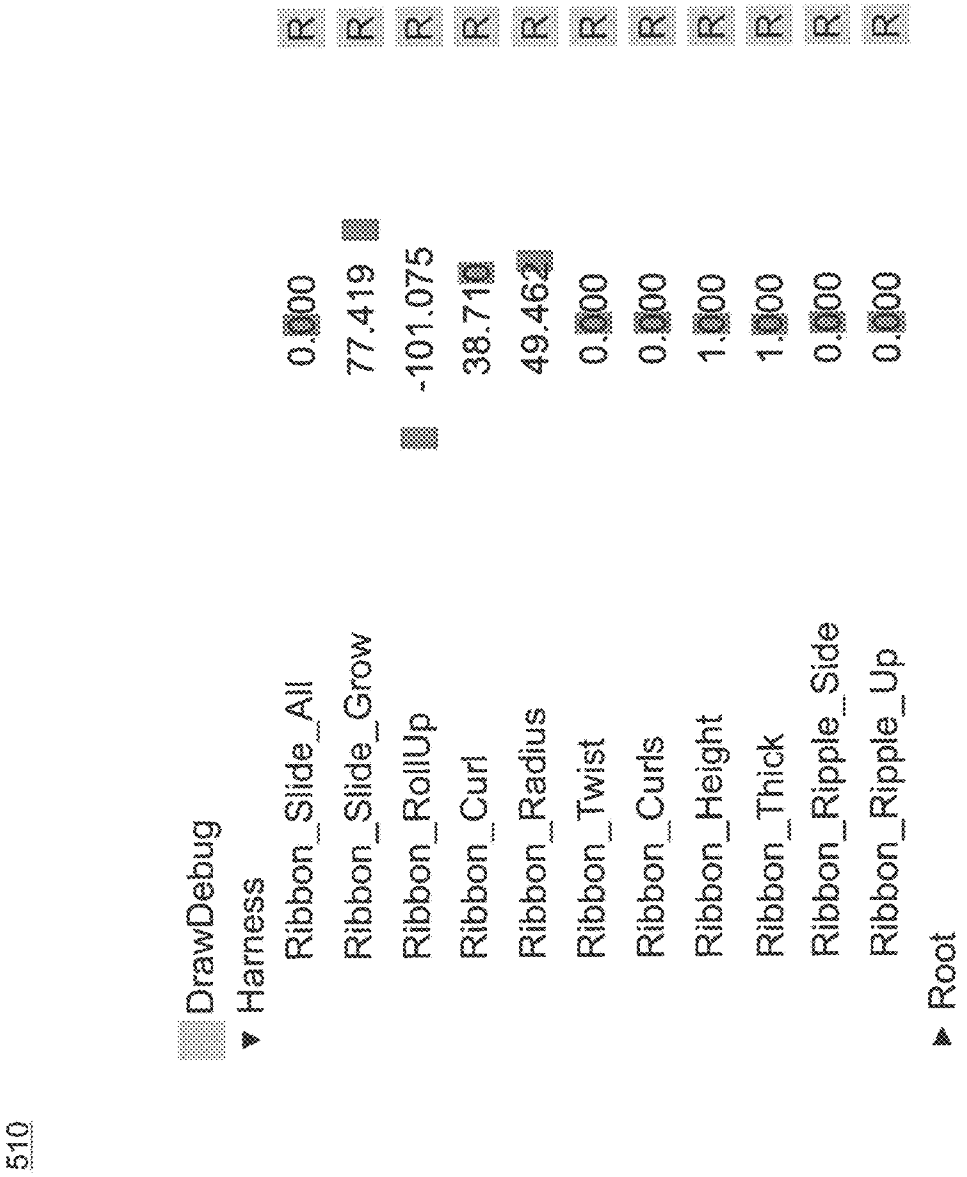

FIGS. 18A-D illustrate additional example embodiments of a deformable asset, such as a ribbon, and corresponding deformation channel values, according to at least one embodiment. As described elsewhere herein, the asset depicted in FIGS. 18A-D may be deformed using the plurality of deformation channels, such as shown in FIG. 18D.

Figure 19A:
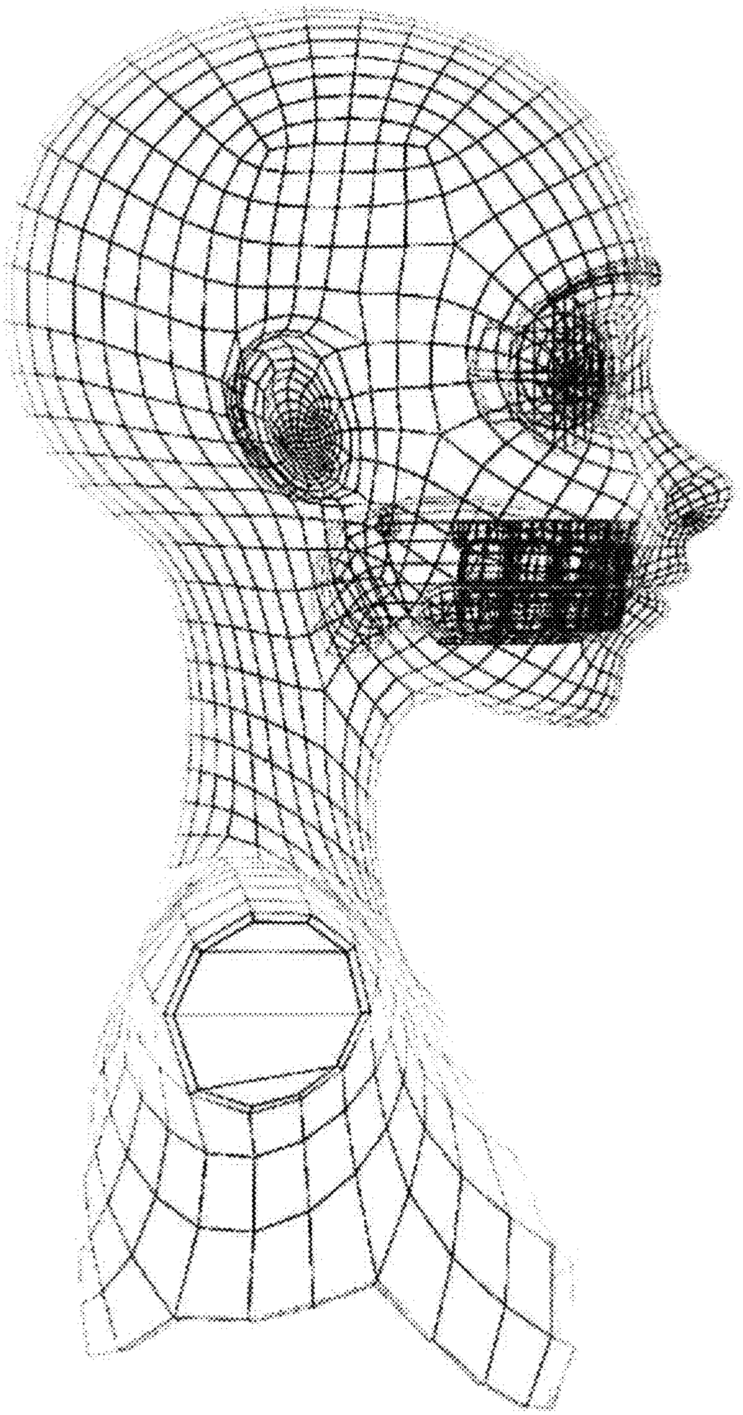
FIGS. 19A-D illustrate an additional example embodiment of a deformable asset in an undeformed state, and corresponding deformation values.
Figure 19B:
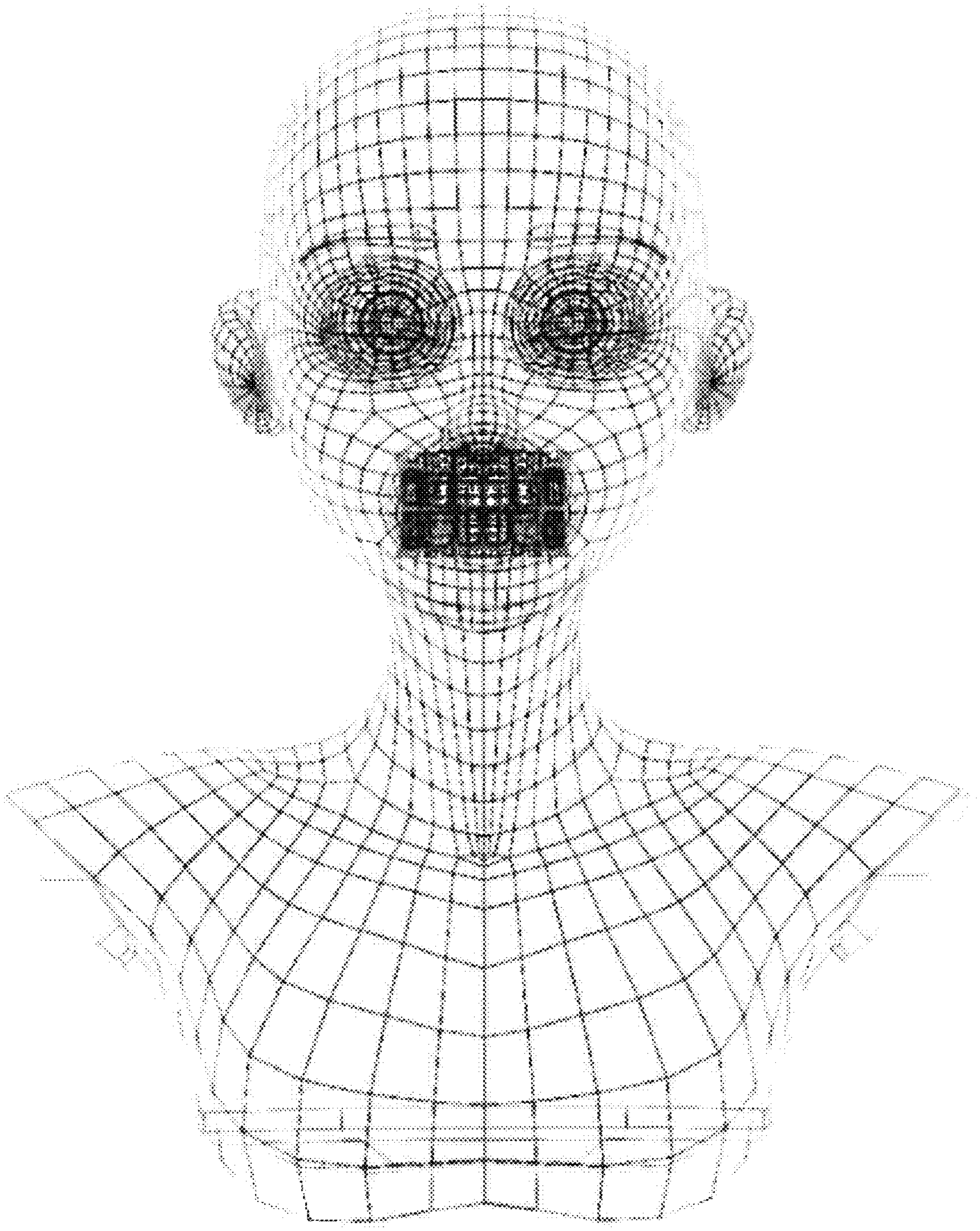
Figure 19C:
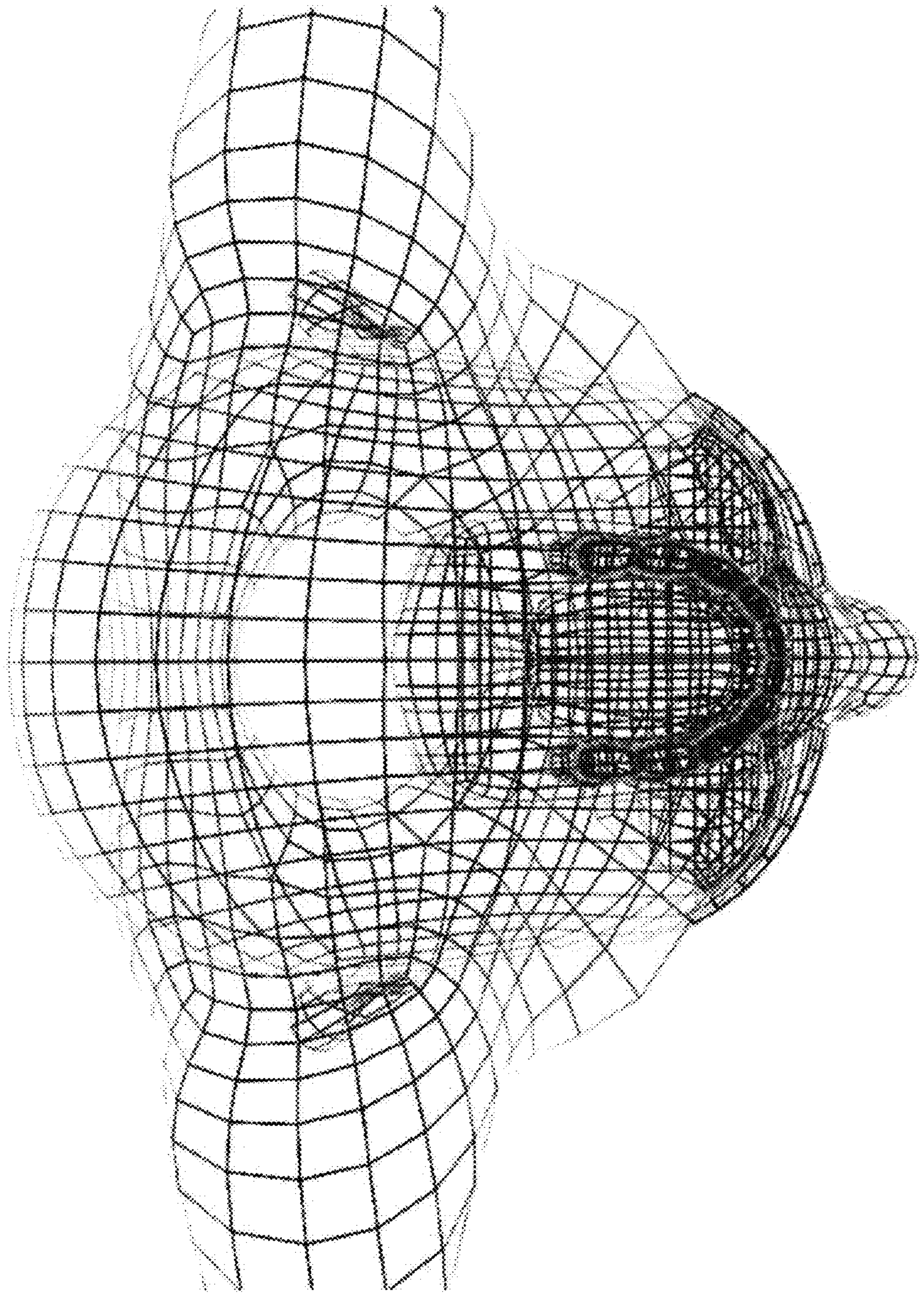
Figure 19D:
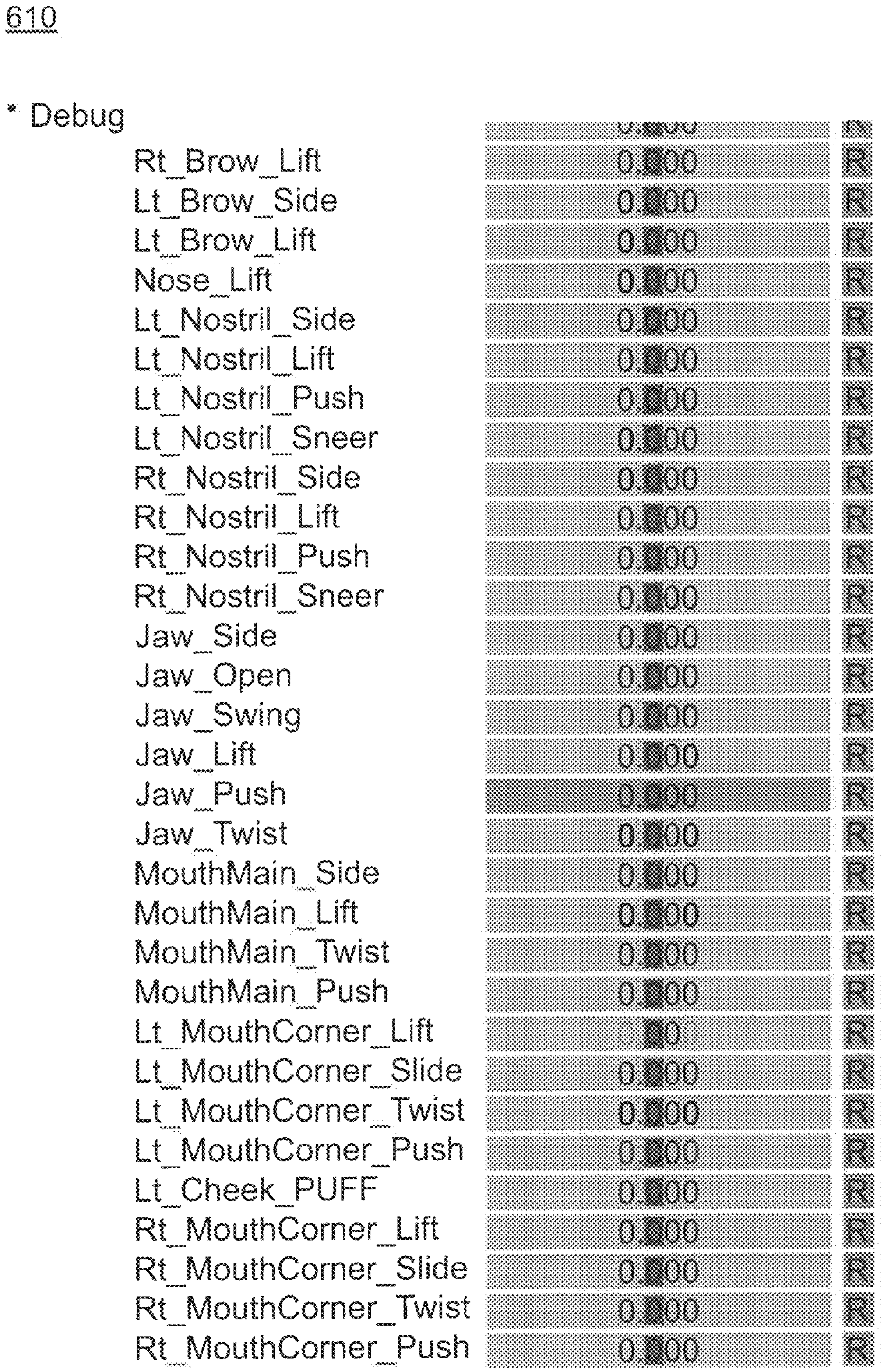

FIGS. 19A-D illustrate additional example embodiments of a naked asset, such as a human character, in an undeformed state. As described herein, the asset includes a mesh, as can be seen in FIGS. 19A-C. As described elsewhere herein, the asset depicted in FIGS. 19A-D may be deformed using the plurality of deformation channels, such as shown in FIG. 19D. In various embodiments.

Figure 20A:
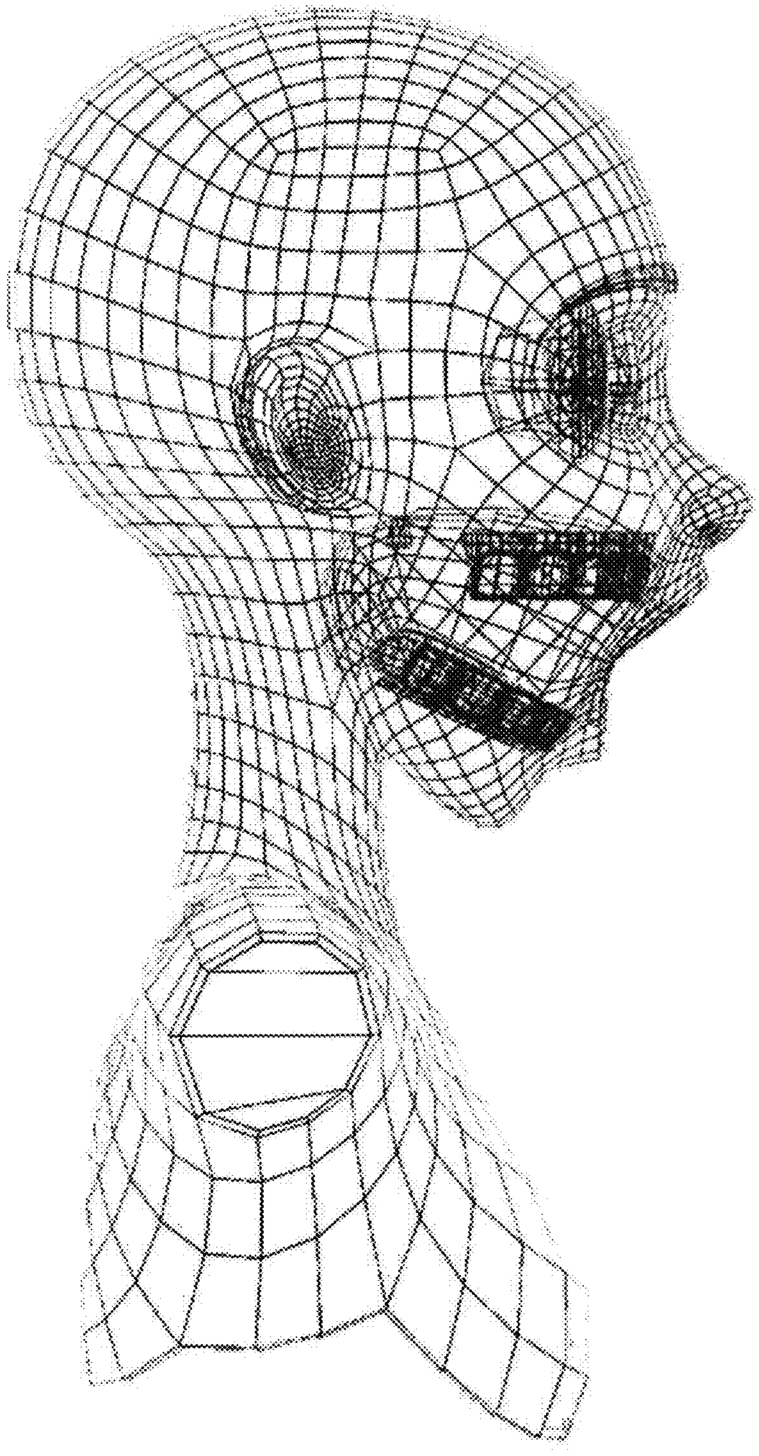
FIGS. 20A-D illustrate an additional example embodiment of a deformable asset, in a deformed state, and corresponding deformation values.
Figure 20B:
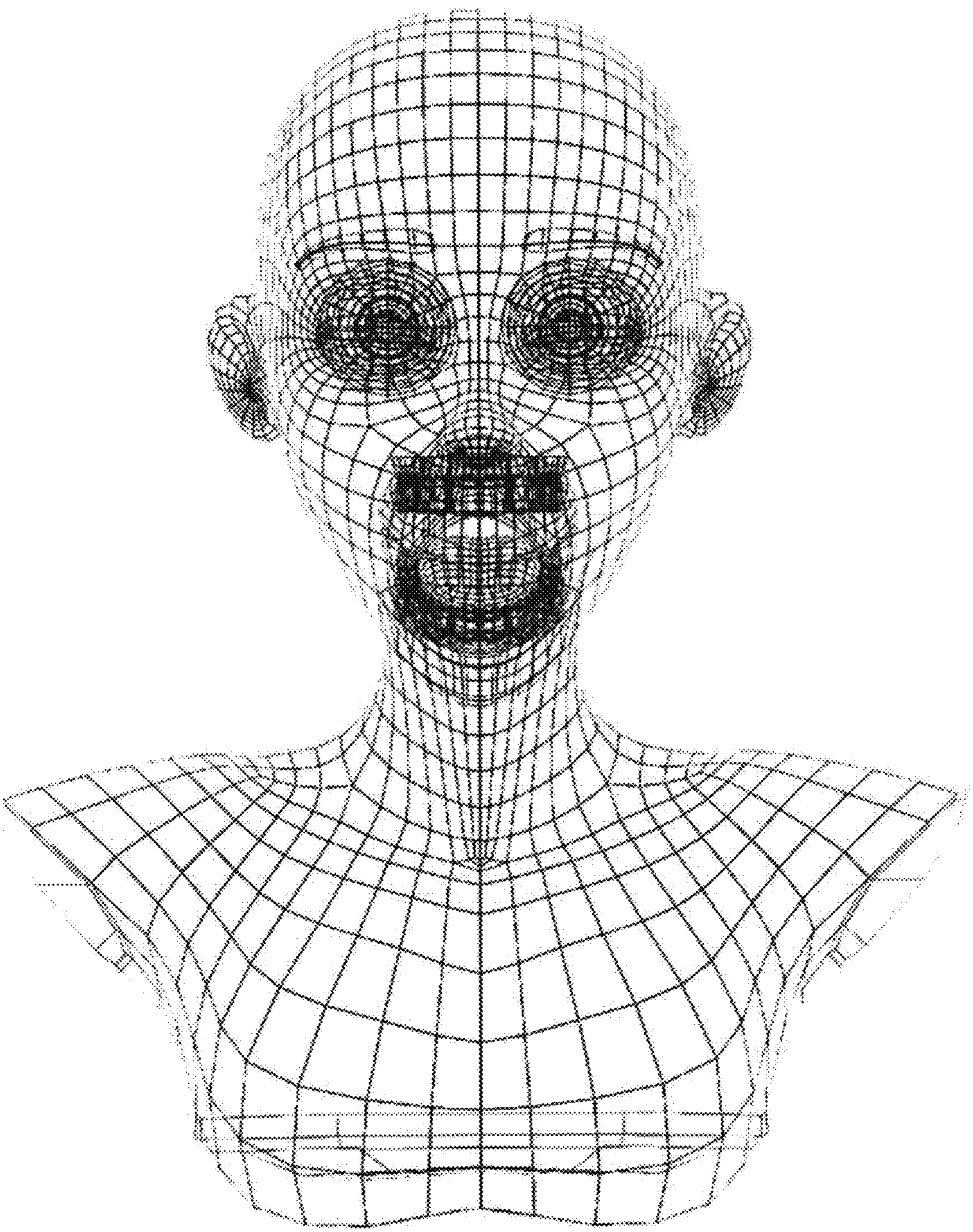
Figure 20C:
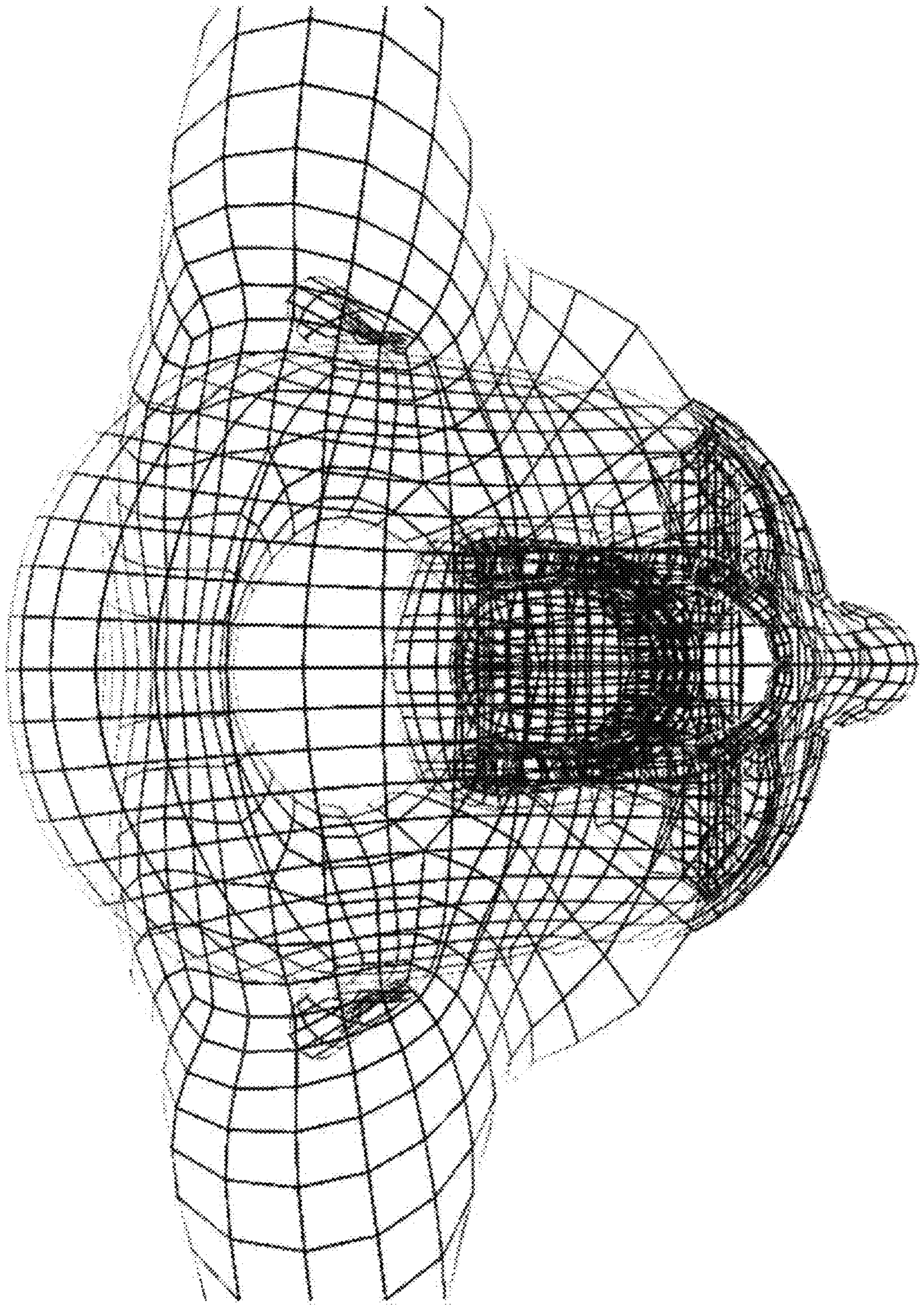
Figure 20D:
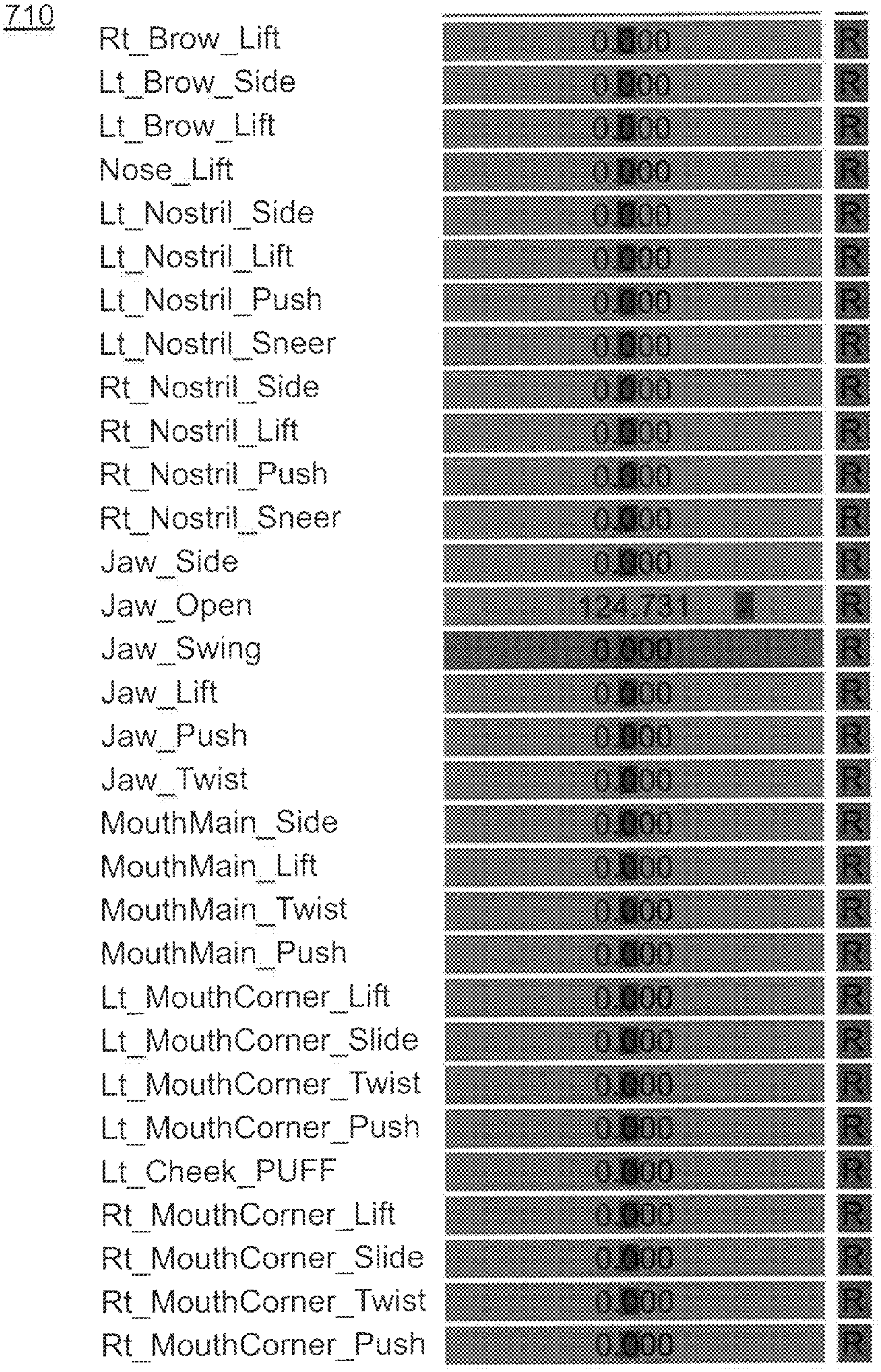

FIGS. 20A-D illustrate additional example embodiments of a deformable asset, such as a human character, in a deformed state. As described herein, the asset includes a mesh, as can be seen in FIGS. 20A-C. As described elsewhere herein, the asset depicted in FIGS. 20A-D may be deformed using the plurality of deformation channels, such as shown in FIG. 20D. In various embodiments.

Figure 21:
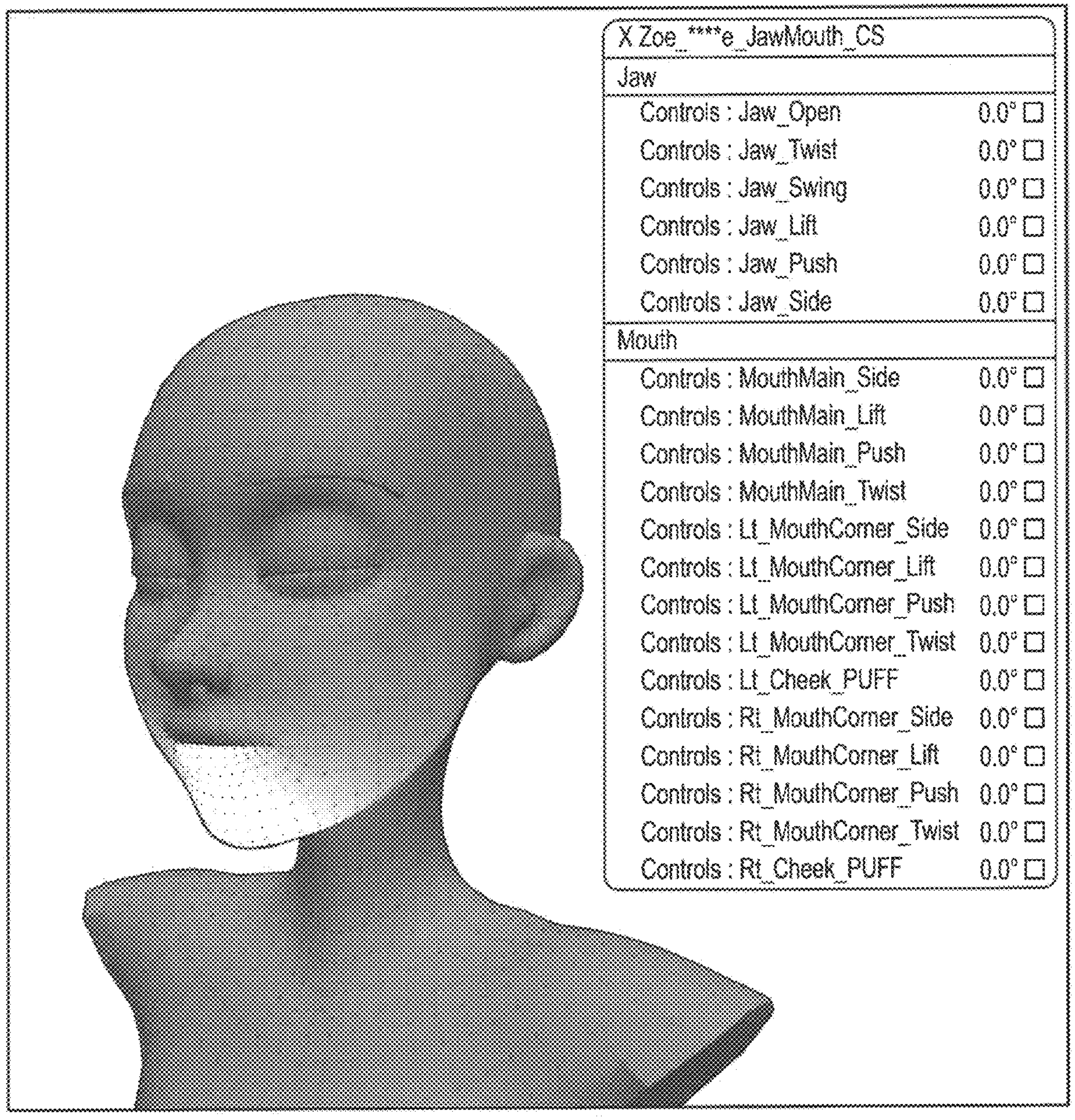
FIG. 21 illustrates an additional example embodiment of a weight map.

FIG. 21 illustrates an additional example embodiment of a weight map, as described herein, associated with an asset (e.g., a weight map for the asset jaw).

The systems and methods described herein may be implemented using computer programming or engineering techniques including computer software, firmware, hardware or any combination or subset thereof.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a tensor processing unit or inference unit (TPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable and include any computer program stored in memory for execution by personal computers, workstations, clients and servers. Such instructions, when executed by a processor, cause the processor to perform at least a portion of the methods described herein.

Also, in the embodiments described herein, additional input devices may be, but are not limited to, computer peripherals associated with an operator interface such as a mouse and a keyboard. Alternatively, other computer peripherals may also be used that may include, for example, but not be limited to, a camera, a scanner, and the like.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for optimizing dynamic smoothing, the method comprising:

receiving, by at least one processor, input data comprising an asset geometry, the asset geometry defining an asset mesh structure comprising a plurality of polygons and vertices;

determining, by the at least one processor, a region of the asset mesh structure to be deformed during animation;

pre-calculating, by the at least one processor, an input file defining asset geometry via a collection of triangles and/or n-sided polygons forming a mesh, the input file comprising a weight map;

storing, by the at least one processor, the weight map in association with the asset mesh structure, the weight map defining an influence of a deformer channel over a region;

during real-time animation, applying, by the at least one processor, the weight map to the asset mesh structure to generate a geometry corresponding to a deformed state of the region, wherein applying the weight map to the asset mesh structure comprises:

calculating a subset of renderable sub-divided meshes vertex positions;

updating the subset of renderable sub-divided meshes vertex positions; and updating a resolution of the sub-divided meshes using a triangle sub-division algorithm; and rendering, by the at least one processor, an image of the deformed asset mesh structure.

2. The method of claim 1, wherein the asset mesh structure excludes an internal framework.

3. The method of claim 1, wherein the region of the asset mesh structure comprises the whole asset mesh structure.

4. The method of claim 1, wherein the weight map comprises a set of surface weights.

5. The method of claim 4, wherein the at least one weight map comprises at least one of: a layered weight map; an animated weight map; or an adjustable weight map.

6. The method of claim 1, further comprising: performing selective geometry subdivision to the asset geometry; and identifying at least one subdivision for higher visual fidelity.

7. The method of claim 1, further comprising performing rasterization and/or ray trace deformed geometry.

8. The method of claim 1, wherein the region to be deformed is associated with one or more deformer channels, each deformer channel being configured to control a specific geometric transformation of the asset mesh structure.

9. The method of claim 1, wherein the shape of the deformation produced by a deformer channel is defined by a customizable channel curve editable in a deformer channel editor.

10. The method of claim 1, further comprising saving a combination of deformer channel values as a pose file for reuse across multiple assets, wherein the pose file is applied to a different asset having a different mesh geometry by normalizing shared deformer channel value.

11. A computer system for optimizing dynamic smoothing, the system comprising:

at least one processor; and a memory storing instructions that, when executed by the at least one processor, cause the system to perform operations comprising:

receiving input data comprising an asset geometry, the asset geometry defining an asset mesh structure comprising a plurality of polygons and vertices;

determining a region of the asset mesh structure to be deformed during animation;

pre-calculating an input file defining asset geometry via a collection of triangles and/or n-sided polygons forming a mesh, the input file comprising a weight map, the weight map defining an influence of a deformer channel over a region;

storing the weight map in association with the asset mesh structure;

during real-time animation, applying the weight map to the asset mesh structure to generate a geometry corresponding to a deformed state of the region, wherein applying the weight map to the asset mesh structure comprises:

calculating a subset of renderable sub-divided meshes vertex positions;

updating the subset of renderable sub-divided meshes vertex positions; and updating a resolution of the sub-divided meshes using a triangle sub-division algorithm; and rendering an image of the deformed asset mesh structure.

12. The system of claim 11, wherein the asset mesh structure excludes an internal framework.

13. The system of claim 11, wherein the region of the asset mesh structure comprises the whole asset mesh structure.

14. The system of claim 11, wherein the weight map comprises a set of surface weights.

15. The system of claim 14, wherein the at least one weight map comprises at least one of: a layered weight map; an animated weight map; or an adjustable weight map.

16. The system of claim 11, further comprising: performing selective geometry subdivision to the asset geometry; and identifying at least one subdivision for higher visual fidelity.

17. The system of claim 11, further comprising performing rasterization and/or ray trace deformed geometry.

18. The system of claim 11, wherein the region to be deformed is associated with one or more deformer channels, each deformer channel being configured to control a specific geometric transformation of the asset mesh structure.

19. The system of claim 11, wherein the shape of the deformation produced by a deformer channel is defined by a customizable channel curve editable in a deformer channel editor.

20. The system of claim 11, wherein the system further saves a combination of deformer channel values as a pose file for reuse across multiple assets, wherein the pose file is applied to a different asset having a different mesh geometry by normalizing shared deformer channel values.

* * * * *